US012604245B2

(12) United States Patent
Zeng et al.

(10) Patent No.: US 12,604,245 B2
(45) Date of Patent: Apr. 14, 2026

(54) DATA CACHING METHOD AND RELATED APPARATUS

(71) Applicant: Huawei Technologies Co., Ltd., Shenzhen (CN)

(72) Inventors: Yongbo Zeng, Shenzhen (CN); Cheng Qin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 432 days.

(21) Appl. No.: 18/245,616

(22) PCT Filed: Sep. 2, 2021

(86) PCT No.: PCT/CN2021/116098
§ 371 (c)(1),
(2) Date: Mar. 16, 2023

(87) PCT Pub. No.: WO2022/057628
PCT Pub. Date: Mar. 24, 2022

(65) Prior Publication Data
US 2023/0345322 A1       Oct. 26, 2023

(30) Foreign Application Priority Data

Sep. 16, 2020  (CN) .......................... 202010975458.4
Apr. 16, 2021  (CN) .......................... 202110416187.3

(51) Int. Cl.
*H04N 21/214* (2011.01)
*H04N 21/238* (2011.01)
(Continued)

(52) U.S. Cl.
CPC ....... *H04W 36/02* (2013.01); *H04W 36/0055* (2013.01); *H04W 36/08* (2013.01); *H04W 36/302* (2023.05); *H04W 36/322* (2023.05)

(58) Field of Classification Search
None
See application file for complete search history.

(56) References Cited

U.S. PATENT DOCUMENTS 9,379,933 B1    6/2016  Bishop et al.
10,531,239 B1 *  1/2020  McCarty ............... H04W 4/029
(Continued)

FOREIGN PATENT DOCUMENTS

CN          104640224 A    5/2015
CN          109819040 A    5/2019
(Continued)

*Primary Examiner* — Brian T Pendleton
*Assistant Examiner* — Jean D Saint Cyr
(74) *Attorney, Agent, or Firm* — Conley Rose, P.C.

(57)                ABSTRACT
A data caching method is applied to a first terminal comprising an application processor and a modem processor. The method includes the application processor sending preset path information of a first route to the modem processor, where the preset path information includes a node handover list of the first route, the node handover list includes information about a plurality of nodes, each node corresponds to at least one cell, and information about each node includes a node identifier, a network performance identifier of the node, and a cell identifier corresponding to the node. The modem processor sends first indication information to the application processor, where the first indication information is used to indicate the application processor to cache data, and the first indication information is determined based on the preset path information.

20 Claims, 10 Drawing Sheets

(51) Int. Cl.

| | |
|---|---|
| *H04N 21/24* | (2011.01) |
| *H04N 21/274* | (2011.01) |
| *H04N 21/2747* | (2011.01) |
| *H04N 21/414* | (2011.01) |
| *H04N 21/44* | (2011.01) |
| *H04N 21/442* | (2011.01) |
| *H04N 21/647* | (2011.01) |
| *H04W 36/00* | (2009.01) |
| *H04W 36/02* | (2009.01) |
| *H04W 36/08* | (2009.01) |
| *H04W 36/30* | (2009.01) |
| *H04W 36/32* | (2009.01) |

(56) References Cited

U.S. PATENT DOCUMENTS

| | | | | |
|---|---|---|---|---|
| 11,201,904 | B2 * | 12/2021 | Stumbo | .............. H04N 21/6373 |
| 2013/0308470 | A1 * | 11/2013 | Bevan | ................. H04W 36/322 |
| | | | | 370/252 |
| 2018/0097905 | A1 | 4/2018 | Todasco et al. | |
| 2022/0124597 | A1 | 4/2022 | Yang et al. | |

FOREIGN PATENT DOCUMENTS

| | | | |
|---|---|---|---|
| CN | 109890067 | A | 6/2019 |
| JP | 2014160892 | A | 9/2014 |
| JP | 2019106592 | A | 6/2019 |
| WO | 2020077517 | A1 | 4/2020 |

* cited by examiner

DATA CACHING METHOD AND RELATED APPARATUS

CROSS-REFERENCE TO RELATED APPLICATIONS

This is a U.S. National Stage of International Patent Application No. PCT/CN2021/116098 filed on Sep. 2, 2021, which claims priority to Chinese Patent Application No. 202110416187.3 filed on Apr. 16, 2021, and claims priority to Chinese Patent Application No. 202010975458.4 filed on Sep. 16, 2020. All of the aforementioned patent applications are hereby incorporated by reference in their entireties.

TECHNICAL FIELD

This application relates to the field of communications technologies, and in particular, to a data caching method and a related apparatus.

BACKGROUND

Users usually pass through some fixed routes, for example, a route of taking a train or a high-speed railway, or a route of daily commuting such as taking a bus, taking a subway, or walking. Due to imperfect network planning, cases such as blocking and reflection exist in a propagation environment of communication signals. Therefore, abnormal areas such as weak coverage and coverage holes usually exist on these fixed routes. When passing through these abnormal areas, users usually cannot normally use online applications such as audio applications, video applications, and game applications on terminals. As a result, service freeze (for example, video freeze) occurs, affecting user experience.

SUMMARY

Embodiments of this application disclose a data caching method and a related apparatus, so as to reduce occurrence of service freeze when a user passes through an abnormal area on a fixed route.

According to a first aspect, an embodiment of this application provides a data caching method, applied to a first terminal. The first terminal includes an application processor and a modem processor. The method includes: The application processor sends preset path information of a first route to the modem processor, where the preset path information includes a node handover list of the first route, the node handover list includes information about a plurality of nodes, each node corresponds to at least one cell, and information about each node includes a node identifier, a network performance identifier of the node, and a cell identifier corresponding to the node. The modem processor sends first indication information to the application processor, where the first indication information is used to indicate the application processor to cache data, and the first indication information is determined based on the preset path information.

In this application, the first terminal can obtain, based on the preset path information of the first route, a node and cell to be passed through when passing through the first route and a network performance status of the node; and the modem processor can indicate, based on the preset path information of the first route, the application processor to cache data, to avoid service freeze that occurs when subsequently passing through a node with comparatively poor network performance. This improves user experience.

In a possible implementation, the network performance identifiers of the nodes include a first network performance identifier and a second network performance identifier, and network performance of a node with the first network performance identifier is lower than network performance of a node with the second network performance identifier; and that the modem processor sends first indication information to the application processor includes: the modem processor sends the first indication information to the application processor when the first terminal is at a first node in the node handover list, where a quantity of nodes between the first node and a second node is less than or equal to a first preset threshold, and the second node is a node that is in the node handover list and whose network performance identifier is the first network performance identifier.

In this application, when the quantity of nodes between the first node at which the first terminal is located and the second node with comparatively poor network performance is less than or equal to the first preset threshold, the modem processor can indicate the application processor to cache data. In other words, when determining that the first terminal is to subsequently pass through the second node with comparatively poor network performance, the first terminal can cache data in advance, thereby avoiding service freeze that occurs when passing through the second node with comparatively poor network performance. This improves user experience.

In a possible implementation, the method further includes: The modem processor sends, to the application processor, network information of a first cell in which the first terminal is located: and the application processor determines the preset path information of the first route based on the network information of the first cell.

In this application, the preset path information of the first route is determined based on the network information of the first cell in which the first terminal is located. This avoids a case in which an occasion for subsequently indicating to cache data is improper because a route through which the first terminal passes is incorrectly determined, for example, unnecessary power consumption and overheads caused by caching data in advance when all nodes subsequently passed through are nodes with comparatively good network performance, or a problem of service freeze caused when passing through a node with comparatively poor network performance while data is not cached in advance.

In a possible implementation, the method further includes: The first terminal runs a first application. After that the modem processor sends first indication information to the application processor, the method further includes: The application processor receives the first indication information; and the application processor sends second indication information to the first application, where the second indication information is used to indicate the first application to cache data.

Optionally, when running the first application, the first terminal displays a user interface of the first application.

In this application, the first application can cache data in advance under an indication of the application processor, to avoid a case in which a user cannot normally use the first application when the first terminal subsequently passes through a node with comparatively poor network performance.

In a possible implementation, the first indication information further includes duration of the data caching or duration of camping on the second node.

In this application, the application processor can determine the data caching duration based on the duration of camping on the second node with comparatively poor network performance. For example, use duration of the cached data is the duration of camping on the second node, to ensure that all services remain normal when the first terminal is passing through the second node. This ensures that service experience is not interrupted.

In a possible implementation, the information about each node further includes a network performance identifier of a cell corresponding to the node.

In a possible implementation, the network performance identifiers of the cells include a third network performance identifier and a fourth network performance identifier, and network performance of a cell with the third network performance identifier is lower than network performance of a cell with the fourth network performance identifier.

In this application, the first terminal can obtain, based on the preset path information of the first route, a cell to be passed through when passing through the first route and a network performance status of the cell, so as to determine, based on the network performance status of the cell, whether to cache data in advance, thereby avoiding service freeze that occurs when subsequently passing through a cell with comparatively poor network performance.

In a possible implementation, the cell with the third performance identifier and the cell with the fourth performance identifier meet at least one of the following: a probability of successful cell handover when the terminal is in the cell with the third performance identifier is less than a probability of successful cell handover when the terminal is in the cell with the fourth performance identifier, a probability of successful radio resource control RRC re-establishment when the terminal is in the cell with the third performance identifier is less than a probability of successful RRC re-establishment when the terminal is in the cell with the fourth performance identifier, reference signal received power RSRP when the terminal is in the cell with the third performance identifier is less than RSRP when the terminal is in the cell with the fourth performance identifier, a service delay when the terminal is in the cell with the third performance identifier is greater than a service delay when the terminal is in the cell with the fourth performance identifier, and service freeze duration when the terminal is in the cell with the third performance identifier is greater than service freeze duration when the terminal is in the cell with the fourth performance identifier.

In a possible implementation, a quantity of cells that have the third network performance identifier and that correspond to the node with the first network performance identifier is greater than or equal to a second preset threshold, and a quantity of cells that have the third network performance identifier and that correspond to the node with the second network performance identifier is less than the second preset threshold; and/or a quantity of cells that have the fourth network performance identifier and that correspond to the node with the first network performance identifier is less than or equal to a third preset threshold, and a quantity of cells that have the fourth network performance identifier and that correspond to the node with the second network performance identifier is greater than the third preset threshold.

In a possible implementation, the method further includes: The first terminal receives the preset path information that is of the first route and that is sent by a network device.

In a possible implementation, before that the first terminal receives the preset path information that is of the first route and that is sent by a network device, the method further includes: sending, to the network device, network information of a second cell in which the first terminal is located, where the preset path information of the first route is determined based on the network information of the second cell.

In a possible implementation, the method further includes: The first terminal sends, to the network device, historical communication information obtained when passing through the first route, where the historical communication information includes at least one of the following: an identifier of a cell in which the first terminal is located, an indication indicating whether cell handover succeeds, an indication indicating whether RRC re-establishment succeeds, RSRP, a service delay, a service status indication, and service freeze duration, and the historical communication information is used to determine the preset path information of the first route.

In this application, the preset path information that is of the first route and that is received by the first terminal may be determined by the network device based on the historical communication information obtained by the first terminal when passing through the first route, that is, the preset path information is determined based on an actual network status, so that a result of determining, by the first terminal based on the preset path information of the first route, whether to cache data in advance is more accurate.

According to a second aspect, an embodiment of this application provides a data caching method, applied to a network device. The method includes: sending preset path information of a first route to a first terminal, where the preset path information includes a node handover list of the first route, the node handover list includes information about a plurality of nodes, each node corresponds to at least one cell, information about each node includes a node identifier, a network performance identifier of the node, and a cell identifier corresponding to the node, and the preset path information is used by the first terminal to determine a data caching policy.

Optionally, the data caching policy includes data pre-caching.

In this application, when passing through the first route, the first terminal can obtain, based on the preset path information that is of the first route and that is sent by the network device, a node and cell to be passed through when passing through the first route and a network performance status of the node, so as to determine, based on the preset path information of the first route, whether to pre-cache data, thereby avoiding service freeze that occurs when subsequently passing through a node with comparatively poor network performance. This improves user experience.

In a possible implementation, the method further includes: receiving network information of a second cell in which the first terminal is located; and determining the preset path information of the first route based on the network information of the second cell.

In this application, the preset path information of the first route is determined based on the network information of the second cell in which the first terminal is located This avoids a case in which the first terminal subsequently pre-caches data on an improper occasion because a route through which the first terminal passes is incorrectly determined, for example, unnecessary power consumption and overheads caused by pre-caching data when all nodes subsequently passed through are nodes with comparatively good network performance, or a problem of service freeze caused when passing through a node with comparatively poor network performance while data is not pre-cached.

In a possible implementation, the method further includes: receiving historical communication information that is sent by the first terminal and that is obtained when passing through the first route, where the historical communication information includes at least one of the following: an identifier of a cell in which the first terminal is located, an indication indicating whether cell handover succeeds, an indication indicating whether RRC re-establishment succeeds, RSRP, a service delay, a service status indication, and service freeze duration, and the historical communication information is used to determine the preset path information of the first route.

Optionally, the network device may further receive historical communication information that is sent by another terminal and that is obtained when passing through the first route. Optionally, the network device may determine the preset path information of the first route based on historical communication information that is sent by a plurality of terminals and that is obtained when passing through the first route.

In this application, the preset path information that is of the first route and that is received by the first terminal may be determined by the network device based on historical communication information obtained by at least one terminal when passing through the first route, that is, the preset path information is determined based on an actual network status. In this way, even if a quantity of times a single terminal passes through the first route is comparatively small, the first terminal can still obtain a more accurate network status of the first route, thereby better determining a pre-caching policy.

In a possible implementation, the network performance identifiers of the nodes include a first network performance identifier and a second network performance identifier, and network performance of a node with the first network performance identifier is lower than network performance of a node with the second network performance identifier.

In a possible implementation, the information about each node further includes a network performance identifier of a cell corresponding to the node.

In a possible implementation, the network performance identifiers of the cells include a third network performance identifier and a fourth network performance identifier, and network performance of a cell with the third network performance identifier is lower than network performance of a cell with the fourth network performance identifier.

In this application, the first terminal can obtain, based on the preset path information of the first route, a cell to be passed through when passing through the first route and a network performance status of the cell, so as to determine, based on the network performance status of the cell, whether to pre-cache data, thereby avoiding service freeze that occurs when subsequently passing through a cell with comparatively poor network performance.

In a possible implementation, the cell with the third performance identifier and the cell with the fourth performance identifier meet at least one of the following: a probability of successful cell handover when the terminal is in the cell with the third performance identifier is less than a probability of successful cell handover when the terminal is in the cell with the fourth performance identifier, a probability of successful RRC re-establishment when the terminal is in the cell with the third performance identifier is less than a probability of successful RRC re-establishment when the terminal is in the cell with the fourth performance identifier, RSRP when the terminal is in the cell with the third performance identifier is less than RSRP when the terminal is in the cell with the fourth performance identifier, a service delay when the terminal is in the cell with the third performance identifier is greater than a service delay when the terminal is in the cell with the fourth performance identifier, and service freeze duration when the terminal is in the cell with the third performance identifier is greater than service freeze duration when the terminal is in the cell with the fourth performance identifier.

In a possible implementation, a quantity of cells that have the third network performance identifier and that correspond to the node with the first network performance identifier is greater than or equal to a second preset threshold, and a quantity of cells that have the third network performance identifier and that correspond to the node with the second network performance identifier is less than the second preset threshold; and/or a quantity of cells that have the fourth network performance identifier and that correspond to the node with the first network performance identifier is less than or equal to a third preset threshold, and a quantity of cells that have the fourth network performance identifier and that correspond to the node with the second network performance identifier is greater than the third preset threshold.

According to a third aspect, an embodiment of this application provides a terminal, including a transceiver, a processor, and a memory. The processor includes an application processor and a modem processor. The memory is configured to store a computer program. The processor invokes the computer program to perform the data caching method according to any one of the first aspect or the implementations of the first aspect in the embodiments of this application.

According to a fourth aspect, an embodiment of this application provides a network device, including a transceiver, a processor, and a memory. The memory is configured to store a computer program. The processor invokes the computer program to perform the data caching method according to any one of the second aspect or the implementations of the second aspect in the embodiments of this application.

According to a fifth aspect, an embodiment of this application provides a computer storage medium. The computer storage medium stores a computer program. When the computer program is executed by a processor, the data caching method according to any one of the first aspect, the second aspect, the implementations of the first aspect, or the implementations of the second aspect in the embodiments of this application is implemented.

According to a sixth aspect, an embodiment of this application provides a computer program product. When the computer program product is run on an electronic device, the electronic device is enabled to perform the data caching method according to any one of the first aspect, the second aspect, the implementations of the first aspect, or the implementations of the second aspect in the embodiments of this application.

According to a seventh aspect, an embodiment of this application provides an electronic device. The electronic device includes performing the method or apparatus described in any embodiment of this application. The electronic device is, for example, a chip.

BRIEF DESCRIPTION OF DRAWINGS

The following describes accompanying drawings used in embodiments of this application.

DESCRIPTION OF EMBODIMENTS

Figure 1:
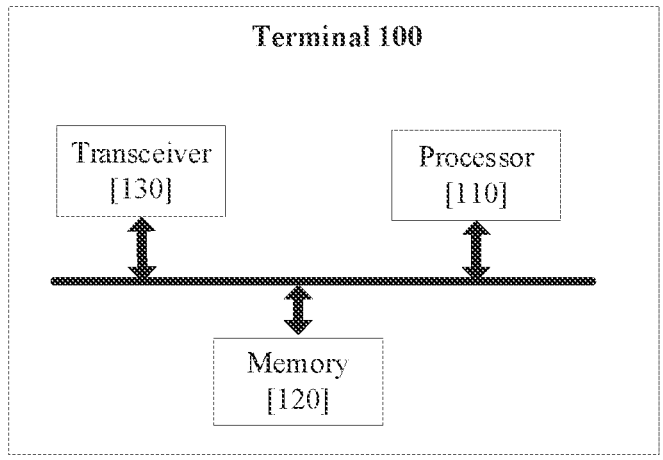
FIG. 1 is a schematic diagram of a structure of a terminal according to an embodiment of this application.

Terms used in the following embodiments of this application are merely intended to describe specific embodiments, but are not intended to limit this application Terms "one", "a", "the", "the foregoing", "this", and "the one" of singular forms used in this specification and the appended claims of this application are also intended to include plural forms, unless otherwise specified in the context clearly. It should be further understood that a term "and/or" used in this application indicates and includes any or all possible combinations of one or more listed items.

This application provides a data caching method, which may be applied to a first system. The first system may include a terminal and a network device. When a user passes through a fixed route, the terminal used by the user may receive preset path information, of the fixed route, sent by the network device. The preset path information may include a cell handover list and/or node handover list of the fixed route. The terminal can obtain, in advance based on the preset path information, a cell and/or node that are/is to be passed through and whose network performance is poor, so as to determine how to cache data, thereby reducing service freeze caused by poor network performance, and improving user experience.

Optionally, the cell handover list includes cell identifiers. Optionally, the cell handover list includes cell performance identifiers Optionally, the cell handover list includes node identifiers corresponding to cells. Optionally, the node handover list includes node identifiers Optionally, the node handover list includes node performance identifiers. Optionally, the node handover list includes cell identifiers corresponding to nodes. Optionally, the node handover list includes cell performance identifiers of cells corresponding to nodes.

Optionally, the network device may determine the preset path information of the fixed route based on historical communication information reported by at least one terminal. Optionally, the network device may determine the preset path information of the fixed route based on historical communication information reported by a plurality of terminals. For a single terminal, a quantity of times of passing through the fixed route is comparatively small. Therefore, compared with the preset path information of the fixed route obtained based on historical communication information of a single terminal, the preset path information of the fixed route obtained based on historical communication information reported by a plurality of terminals is more comprehensive and reliable, so that network performance of a cell and a node can be more effectively identified, thereby optimizing user experience. Optionally, the historical communication information reported by the terminal includes, for example but not limited to, an identifier of a cell that provides a service for the terminal, an identifier indicating whether cell handover succeeds, reference signal received power (received signal receiving power, RSRP), an identifier indicating whether radio resource control (radio resource control. RRC) re-establishment succeeds, a service delay, a service status identifier, and service freeze duration.

Optionally, the cell identifier and the node identifier may be identities (identity, ID). Optionally, one node corresponds to one unique node identifier. Optionally, one cell corresponds to one unique cell identifier. Optionally, the cell identifier may be a cell global identity (cell global identity, CGI). In different wireless communications systems, names of cell identifiers may be different. For example, a cell identifier in long term evolution (long term evolution, LTE) is referred to as a radio access network CGI (evolved universal mobile telecommunications system CGI. E-UTRAN CGI), and a cell identifier in new radio (new radio, NR) is referred to as a new radio cell global identifier (new radio cell global identifier, NCGI).

Optionally the network device may classify cells based on network performance. Optionally, one type of cell may correspond to one cell performance identifier, and different types of cells correspond to different cell performance identifiers. Optionally, the network device may classify nodes based on network performance. Optionally, one type of node may correspond to one node performance identifier, and different types of nodes correspond to different node performance identifiers.

Optionally, the terminal may be authorized by the user to report the historical communication information. For example, a setting interface of the terminal displays an experience improvement function, and the user may enable the experience improvement function. In response to enabling the experience improvement function by the user, the terminal may report the historical communication information to the network device. Not limited thereto, the terminal may also be authorized by the user to report information such as a historical call record, a communication exception notification, a temperature, and power.

It can be understood that a cell (cell) may also be referred to as a cellular cell, and is an area covered by a base station or a part (for example, a sector antenna) of a base station. One base station can cover at least one cell, and a terminal in a cell can communicate with a base station to which the cell belongs.

In this application, one node may correspond to at least one cell. Optionally, that one node may correspond to at least one cell may be understood as that one node includes at least one cell. Optionally, when deploying a cellular network, an operator may deploy at least one cell in one specific range based on conditions such as a service requirement and a propagation environment. A set of at least one cell deployed in one specific range may be referred to as a node. Optionally, the specific range may be but is not limited to a signal coverage range or a geographical space range. Optionally, one node is a set of a plurality of cells. Optionally, there may be at least one base station in one node. Optionally, cell information of a plurality of cells corresponding to one node meets a preset condition. Optionally, the preset condition includes: at least two of a plurality of cells corresponding to one node correspond to a same base station identifier. Optionally, the preset condition includes: at least two of a plurality of cells corresponding to one node have a same physical cell identifier (physical cell identifier. PCI). Optionally, the preset condition includes: geographical space ranges in which a plurality of cells corresponding to one node are located are all within a first geographical range. Optionally, the preset condition includes: a distance between at least two of a plurality of cells corresponding to one node is less than a preset distance threshold. Optionally, the preset condition further includes: at least two of a plurality of cells corresponding to one node are in a handover relationship. Optionally, the preset condition further includes: frequencies of a plurality of cells corresponding to one node are different from each other For example, a node 1 includes a cell 1, a cell 2, and a cell 3, frequencies of the three cells are different from each other, and at least two of the three cells have a same base station identifier.

For example, a node 1 includes a cell 1, a cell 2, and a cell 3, frequencies of the three cells are different from each other, the three cells have a same PCI, the cell 1 and the cell 2 are in a handover relationship, and the cell 3 and the cell 1 are in a handover relationship.

For example, a node 1 includes a cell 1, a cell 2, and a cell 3, frequencies of the three cells are different from each other, a distance between a central location in the cell 1 and a central location in the cell 2 is less than a preset distance threshold, and a distance between a central location in the cell 2 and a central location in the cell 3 is less than a preset distance threshold.

The preset condition is not limited to the foregoing enumerated cases. In specific implementation, the preset condition may include: an overlapping degree of location mark ranges of a plurality of cells corresponding to one node is greater than or equal to a preset overlapping threshold. A location mark range of a cell may be a set of a plurality of global positioning system (global positioning system, GPS) locations reported by a terminal in the cell. A manner of determining a plurality of cells corresponding to a node is not limited in the embodiments of this application.

A terminal and a network device provided in the embodiments of this application are first described.

In this application, the terminal may be a device having a wireless communication function. Optionally, the terminal may also be user equipment (user equipment, UE), a mobile station, an access terminal, a user agent, or the like. For example, the terminal may be a device such as a mobile phone, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable electronic device (a smart band, smart glasses, or the like), or a smart screen.

FIG. 1 is an example of a schematic diagram of a structure of a terminal. The terminal 100 may include a processor 110, a memory 120, and a transceiver 130. The processor 110, the memory 120, and the transceiver 130 may be connected to each other through a bus.

The processor 110 may be one or more central processing units (central processing unit. CPU). When the processor 110 is one CPU, the CPU may be a single-core CPU, or may be a multi-core CPU. Optionally, the processor 110 may include one or more processing units. For example, the processor 110 may include an application processor (application processor, AP) and a modem processor (modem). Different processing units may be independent components, or may be integrated into one or more processors. In some embodiments, a memory may be further disposed in the processor 110, and is configured to store instructions and data. Optionally, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, and reduces a waiting time of the processor 110, thereby improving system efficiency.

The memory 120 includes but is not limited to a random access memory (random access memory, RAM), a read-only memory (read-only memory, ROM), an erasable programmable read only memory (erasable programmable read only memory, EPROM), or a compact disc read-only memory (compact disc read-only memory, CD-ROM). The memory 120 is configured to store a related computer program and data.

The transceiver 130 is configured to receive and send data. The terminal 100 may use the transceiver 130 to communicate with a network device by using a wireless communications technology. The wireless communications technology may include a global system for mobile communications (global system for mobile communications. GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a GPS, a global navigation satellite system (global navigation satellite system, GLONASS), a BeiDou navigation satellite system (BeiDou navigation satellite system. BDS), a quasi-zenith satellite system (quasi-zenith satellite system, QZSS), and/or a satellite based augmentation system (satellite based augmentation system. SBAS). In some embodiments, the transceiver 130 may provide a solution, applied to the terminal 100, for wireless communication including 2G, 3G, 4G, 5G, and the like.

In some embodiments, a wireless communication function of the terminal 100 may be implemented by using the transceiver 130, the modem, the AP, and the like. Optionally, an electromagnetic wave received by the transceiver 130 may be transmitted to the modem for demodulation. Optionally, the modem may transmit, to the AP for processing, a low-frequency baseband signal obtained through demodulation. Optionally, the modem may determine, based on the electromagnetic wave received by the transceiver 130, network information of a cell in which the terminal 100 is located. Optionally, the network information of the cell may include a cell identifier, but is not limited thereto. In specific implementation, the network information of the cell may further include a tracking area code (tracking area code, TAC). Specific content included in the network information of the cell is not limited in this application.

Optionally, a memory in the AP may store preset path information of a plurality of routes. Optionally, the preset path information of the plurality of routes may be loaded when the terminal 100 is powered on. Optionally, preset path information of a route includes a node handover list of the route, the node handover list includes information about a plurality of nodes, and each node corresponds to at least one cell. Optionally, the information about each node includes a node identifier. Optionally, the information about each node includes a network performance identifier (which may be referred to as a node performance identifier) of the node. Optionally, the information about each node includes a cell identifier corresponding to the node. Optionally, the information about each node includes a network performance identifier (which may be referred to as a cell performance identifier) of a cell corresponding to the node. The network performance identifier of the cell is different from the network performance identifier of the node, and the difference specifically lies in different determining manners. For example, the cell performance identifier is determined based on a network performance parameter (such as a call drop probability, a cell handover success probability, or service freeze duration) of the cell, and the node performance identifier is determined based on a quantity of cells with different network performance identifiers in the node.

Optionally, the modem may send, to the AP, the network information of the cell in which the terminal 100 is located. Optionally, the AP may determine preset path information of a first route from the preset path information of the plurality of routes based on the network information of the cell in which the terminal 100 is located. Optionally, the preset path information of the first route includes cell identifiers of a plurality of cells on the first route, and one of the plurality of cell identifiers is the same as the identifier of the cell in which the terminal 100 is located. Optionally, the modem may receive the preset path information that is of the first route and that is sent by the AP. Optionally, a memory in the modem may store the preset path information of the first route. Optionally, the modem may determine, based on the network information of the cell in which the terminal 100 is located in real time and the preset path information of the first route, whether a node to be subsequently passed through by the terminal 100 on the first route includes a node with comparatively poor network performance.

Optionally, the modem may send first indication information to the AP when determining that the node to be subsequently passed through by the terminal 100 on the first route includes a node with comparatively poor network performance. Optionally, when determining that the node to be subsequently passed through by the terminal 100 on the first route includes a node with comparatively poor network performance and the terminal 100 is currently at a first node on the first route, the modem may send first indication information to the AP. Optionally, the AP caches data based on the first indication information. Optionally, a quantity of nodes between the first node and a second node is less than or equal to a first preset threshold. The second node is a node, determined by the modem, that is to be subsequently passed through by the terminal 100 on the first route and that has comparatively poor network performance. Optionally, the AP sends second indication information to a first application based on the first indication information. Optionally, the first application caches data based on the second indication information. Optionally, the first application is a foreground application. Applications running on the terminal may include a foreground application and a background application. The terminal displays a user interface of the foreground application, and does not display a user interface of the background application. In other words, the user interface of the foreground application is visible to a user, and the user interface of the background application is invisible to the user. In addition, the terminal may detect a user operation (for example, a tap operation acting on a display screen) when displaying the user interface of the foreground application: in response to the user operation, the terminal may execute a corresponding task based on the foreground application. This may be understood as that the foreground application can interact with the user, whereas the background application cannot interact with the user.

Optionally, the modem may send duration of camping on a plurality of nodes on the first route to the AP. Optionally, the modem may send duration of camping on the second node to the AP. Optionally, the modem may send duration of camping on the first node and duration of camping on a node between the first node and the second node to the AP. Optionally, the first indication information may include duration of the data caching Optionally, the modem may send duration of the data caching together with the first indication information to the AP. Optionally, the AP itself may determine duration of the data caching. Optionally, the duration of the data caching may be determined based on the duration of camping on the second node. Optionally, the duration of the data caching may be determined based on the duration of camping on the first node and the duration of camping on the node between the first node and the second node.

In another optional solution, alternatively, the modem may send the first indication information to the AP when determining that cells to be subsequently passed through by the terminal 100 on the first route include a cell with comparatively poor network performance. Optionally, when determining that cells to be subsequently passed through by the terminal 100 on the first route include a cell with comparatively poor network performance and the terminal 100 is currently in a first cell on the first route, the modem sends the first indication information to the AP. Optionally, a quantity of cells between the first cell and a second cell is less than or equal to a second preset threshold. The second cell is a cell, determined by the modem, that is to be subsequently passed through by the terminal 100 on the first route and that has comparatively poor network performance. This solution is similar to the foregoing solution of determining a node that is to be subsequently passed through by the terminal 100 and that has comparatively poor network performance. For details, refer to descriptions of the foregoing node solution. Details are not described again.

Optionally, the terminal 100 may connect to and communicate with a base station by using the transceiver 130. For example, when the terminal 100 is in a cell covered by a base station A, the terminal 100 may connect to and communicate with the base station A by using the transceiver 130. Optionally, a geographical location of the terminal 100 may change. When the terminal is in a cell covered by a base station B, the terminal 100 may cancel a connection to the base station A, and establish a connection to and communicate with the base station B. Optionally, the terminal 100 may determine a location of the terminal 100 and predict a movement direction based on a cell and/or node passed through by the terminal 100. Not limited thereto, the terminal 100 may alternatively determine a location of the terminal 100 and predict a movement direction by using a positioning technology such as GPS. Optionally, the location determining and the movement direction prediction may be performed in real time, for example, once every 10 seconds. Optionally, the location determining and the movement direction prediction may be triggered, for example, once when signal quality deteriorates. Manners of the location determining and the movement direction prediction are not limited in this application.

Optionally, the terminal 100 may send historical communication information to the network device by using the transceiver 130. Optionally, the terminal 100 may receive, by using the transceiver 130, preset path information that is of a fixed route and that is sent by the network device. Optionally, the memory 120 may store the preset path information of the fixed route. Optionally, the processor 110 may determine, with reference to the location, the movement direction, and the preset path information, whether a cell and/or node with comparatively poor network performance is to be passed through. Optionally, the processor 110 may cache data in advance when determining that a cell and/or node with comparatively poor network performance is to be passed through. Optionally, the processor 110 may cache data after entering a cell or node with comparatively poor network performance.

Figure 4:
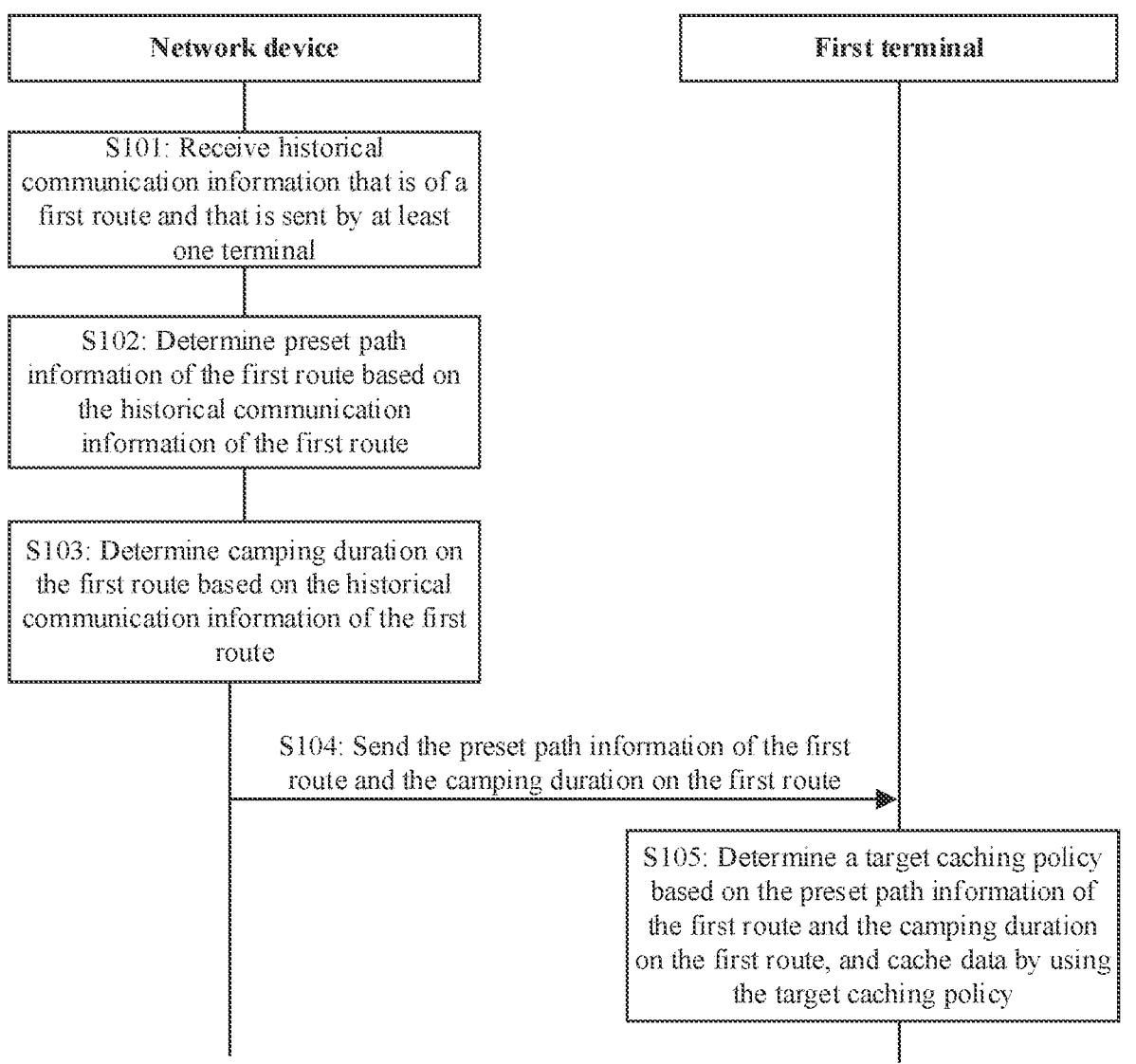
FIG. 4 to FIG. 6 are schematic flowcharts of some data caching methods according to embodiments of this application.
Figure 5:
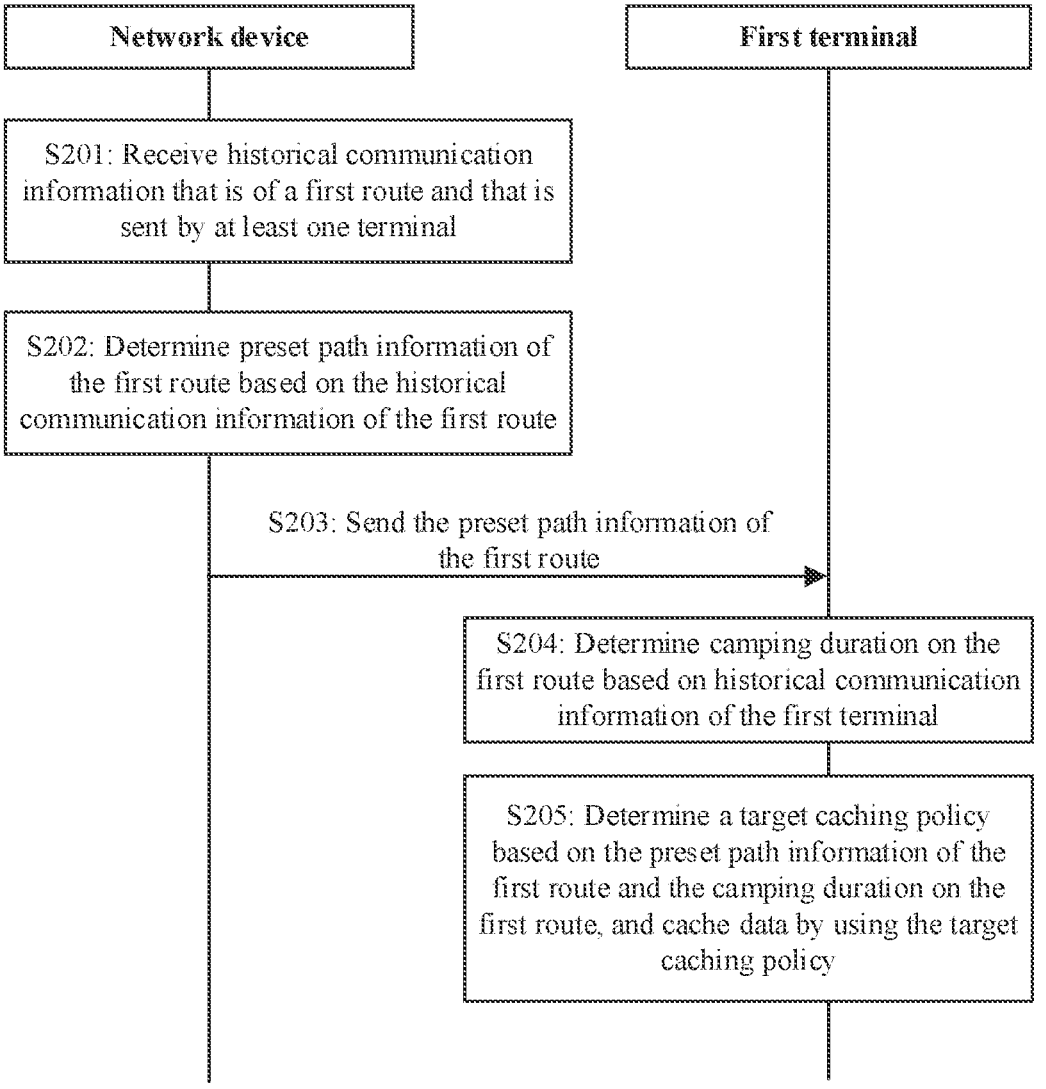
Figure 6:
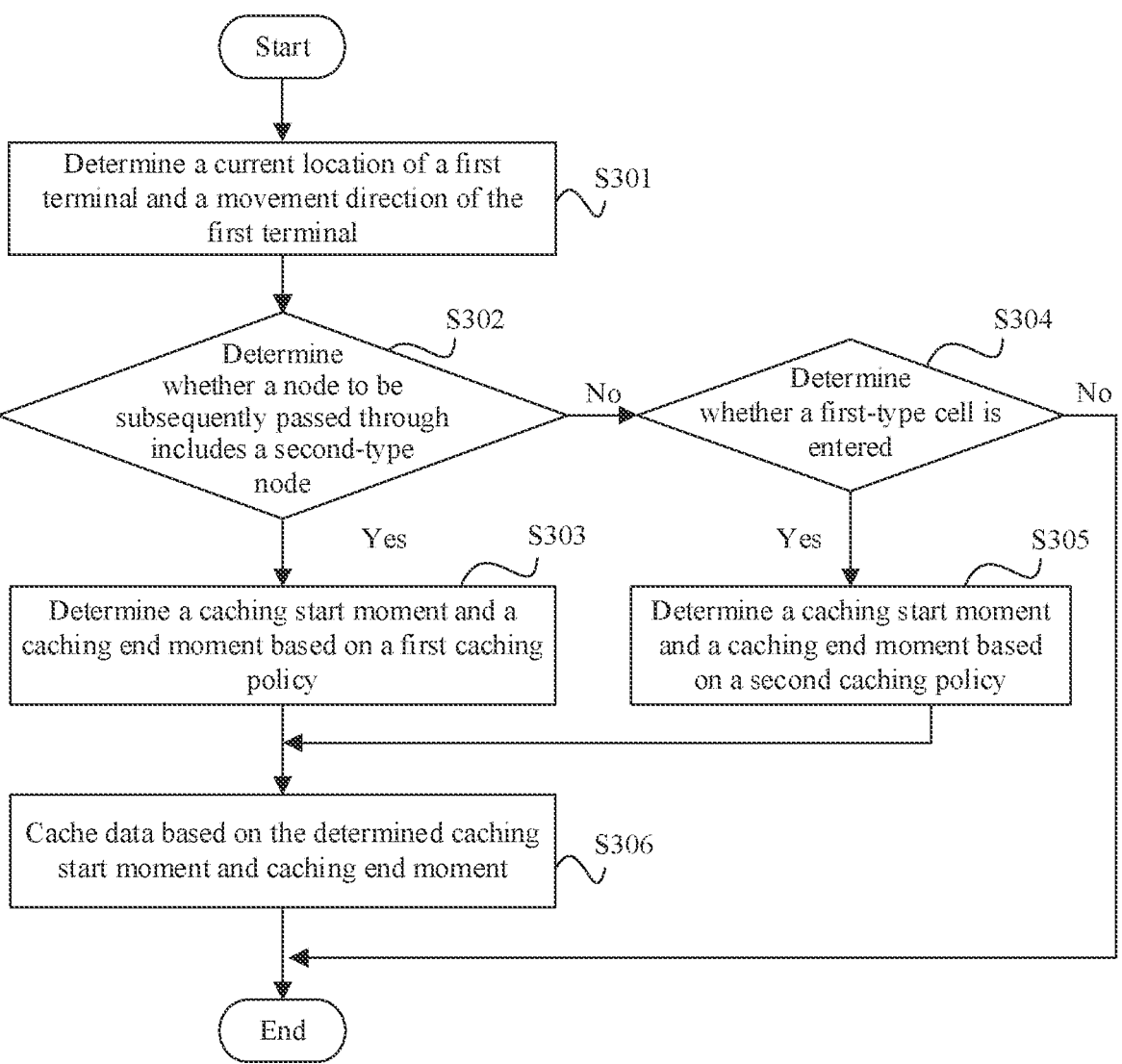

Optionally, the processor 110 in the terminal 100 may be configured to read the computer program and the data that are stored in the memory 120, to perform data caching methods shown in FIG. 4 to FIG. 6, where the terminal 100 is configured to perform steps performed by a first terminal.

In this application, the network device may be a device configured to send or receive information. For example, the network device is a hardware server or a cloud server, and the network device is one server or a server cluster including a plurality of servers. Optionally, the network device is an access network device, for example, a base station, a terminal, a wireless access point (access point, AP), a transmission and reception point (transmission and reception point, TRP), a relay device, or another network device having a function of a base station. Optionally, the network device is a core network device, for example, an access and mobility management function (access and mobility management function. AMF) entity, a session management function (session management function, SMF) entity, or a user plane function (user plane function, UPF) entity. Optionally, the network device is an application server that provides a service for an application. The application may be an application, such as a video application, an audio application, or a game application, installed on the terminal.

Figure 2:
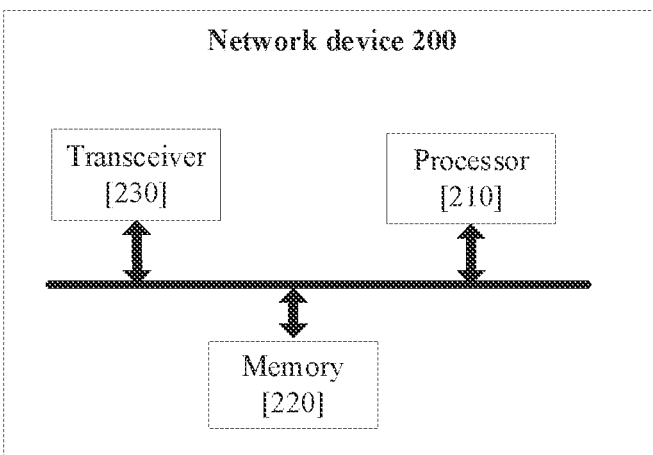
FIG. 2 is a schematic diagram of a structure of a network device according to an embodiment of this application.

FIG. 2 is an example of a schematic diagram of a structure of a network device. The network device 200 may include a processor 210, a memory 220, and a transceiver 230. The processor 210, the memory 220, and the transceiver 230 may be connected to each other through a bus.

The processor 210 may be one or more central processing units (central processing unit, CPU). When the processor 210 is one CPU, the CPU may be a single-core CPU, or may be a multi-core CPU. The memory 220 includes but is not limited to a random access memory (random access memory, RAM), a read-only memory (read-only memory, ROM), an erasable programmable read only memory (erasable programmable read only memory, EPROM), or a compact disc read-only memory (compact disc read-only memory, CD-ROM). The memory 220 is configured to store a related computer program and data.

The transceiver 230 is configured to receive and send data. The network device 200 may use the transceiver 230 to communicate with a terminal by using a wireless communications technology. In some embodiments, the transceiver 230 may provide a solution, applied to the network device 200, for wireless communication including 2G, 3G, 4G, 5G, and the like.

Optionally, the network device 200 may receive, by using the transceiver 230, historical communication information sent by at least one terminal. Optionally, the processor 230 may determine preset path information of a fixed route based on the historical communication information of the terminal. Optionally, the memory 220 may store the preset path information of the fixed route. Optionally, the network device 200 may send the preset path information of the fixed route to the at least one terminal by using the transceiver 230

The processor 210 in the network device 200 may be configured to read the computer program and the data that are stored in the memory 220, to perform data caching methods shown in FIG. 4 to FIG. 6, where the network device 200 is configured to perform steps performed by a network device.

Figure 3:
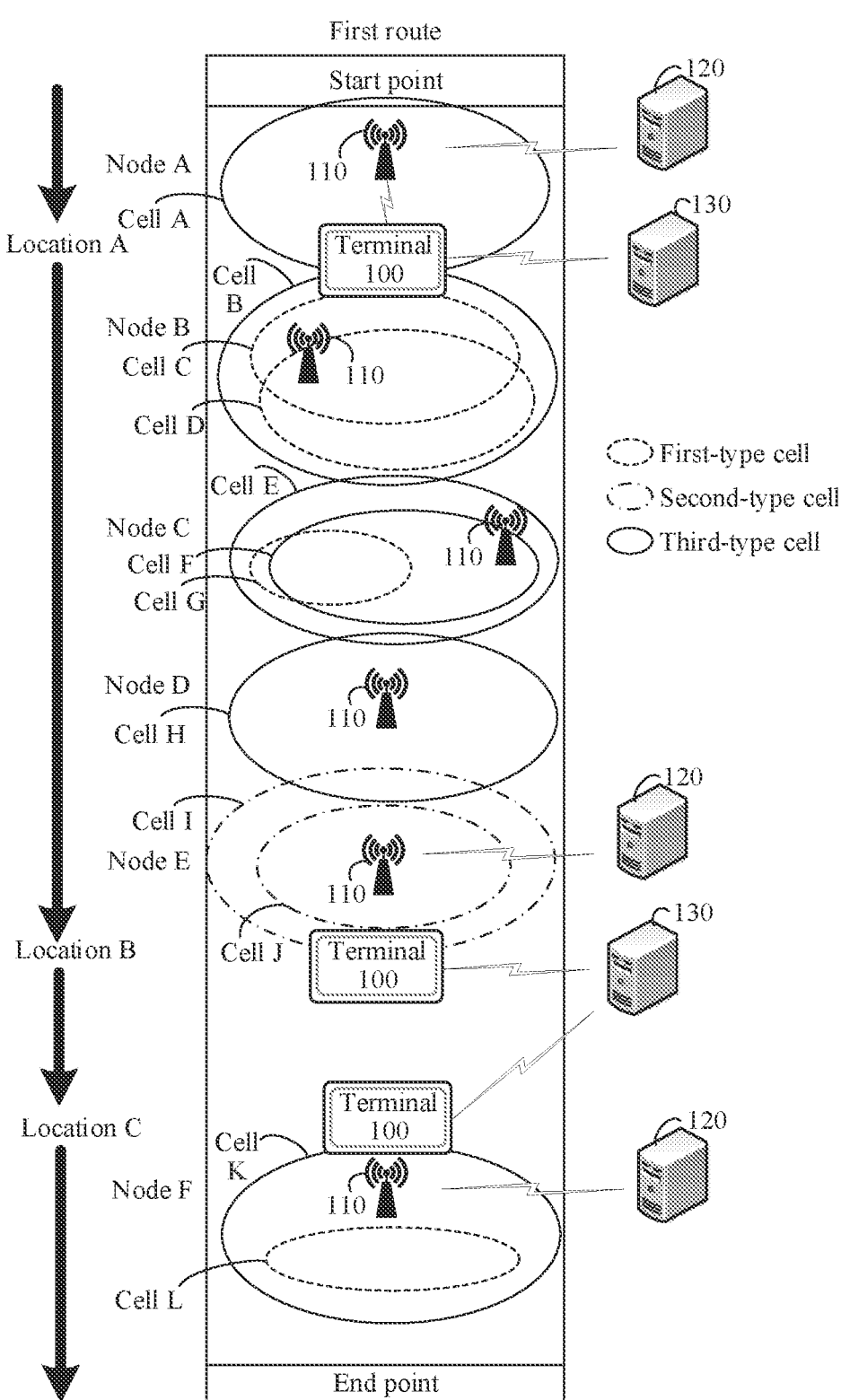
FIG. 3 is a schematic diagram of a data caching scenario according to an embodiment of this application.

FIG. 3 is an example of a schematic diagram of a data caching scenario. The scenario shown in FIG. 3 may include a terminal 100, a base station 110, a server 120, and a server 130.

The base station 110 is a device that is deployed in a radio access network (radio access network, RAN) and that is configured to provide a wireless communication function. In different wireless access systems, base stations may have different names, for example but not limited to, a NodeB (NodeB, NB) in wideband code division multiple access (wideband code division multiple access. WCDMA), an evolved NodeB (evolved NodeB, eNodeB) in long term evolution (long term evolution. LTE), a next generation NodeB (g NodeB, gNB) in a 5th generation mobile communications technology (5th generation mobile networks, 5G), that is, new radio (new radio, NR), or a base station in another future network system.

As shown in FIG. 3, when the terminal 100 is in a cell covered by the base station 110, the terminal 100 may connect to and communicate with the base station 110. The base station 110 may provide a wireless communication function for the terminal 100. Optionally, the server 120 may be a core network device, and the base station 110 may connect to and communicate with the server 120. Optionally, the terminal 100 may communicate with the server 120 through the connected base station 110. Optionally, the server 130 may be an application server that provides a service for an application, an application may be installed on the terminal 100, and the terminal 100 may connect to and communicate with the server 130. Optionally, the terminal 100 may send a request message to the server 130, and the server 130 may send data of the application to the terminal 100 in response to the request message. This process may be referred to as a data caching process, and may also be referred to as a data downloading process. Optionally, the terminal 100 may display a corresponding user interface based on the received data of the application.

As shown in FIG. 3, on a first route, there may be a start point, an end point, and a plurality of nodes between the start point and the end point. Each node may correspond to at least one cell. There may be at least one base station 110 in each node. In FIG. 3, an example in which one base station 110 exists in one node is used for description. On the first route, there may be a plurality of cells covering close geographical space areas. For example, a cell B, a cell C, and a cell D cover close geographical space areas. The first route is, for example, a fixed traveling route of a vehicle such as a train, a high-speed railway, a subway, or a bus, or a fixed route of daily commuting of a user. Nodes and cells through which different terminals pass when passing through the first route are mostly the same. Because frequencies, antenna tilt angles, and the like of different cells are different, network performance (for example, communication quality) of different cells is different, and there may be an abnormal area such as weak coverage or a coverage hole on the first route. When the user passes through the abnormal area, a case such as a call drop or service freeze easily occurs in an online application on the terminal 100, and user experience is poor.

Optionally, the terminal 100 may send, to a network device, historical communication information obtained when passing through the first route. The network device may be an access network device (for example, the base station 110), may be a core network device (for example, the server 120), or may be an application server (for example, the server 130).

Optionally, the network device may obtain a node handover list of the first route based on historical communication information that is of the first route and that is reported by at least one terminal, for example, the node handover list includes a node A, a node B, a node C, a node D, a node E, and a node F. Optionally, the node handover list does not include a node through which the terminal 100 repeatedly passes.

Optionally, cell handover may occur when the terminal 100 passes through the first route. For example, when the terminal 100 is at a location A, cell handover may occur, and a cell that provides a wireless communication service for the terminal 100 may change from a cell A to the cell B. The terminal 100 may cancel a connection to a base station 110 in the node A, and establish a connection to and communicate with a base station 110 in the node B. Subsequently, the terminal 100 may continue traveling on the first route. When the terminal 100 passes through the node B, a cell that provides a wireless communication service for the terminal 100 may change from the cell B to the cell C, then change from the cell C to the cell D, and finally change from the cell D to the cell B. Optionally, the network device may obtain a cell handover list of the first route based on historical communication information that is of the first route and that is reported by at least one terminal. For example, the cell handover list includes the cell A, the cell B, the cell C, the cell D, and the cell B, or includes the cell A, the cell B, the cell C, and the cell D, that is, the cell handover list may not include the cell B through which the terminal 100 repeatedly passes.

The following embodiment is described by using an example in which the cell handover list does not include a repeated cell and optionally records only cells through which the terminal passes for the first time. The following embodiment is described by using an example in which the node handover list does not include a repeated node and optionally records only nodes through which the terminal passes for the first time. It can be understood that the cell handover list and the node handover list are estimated or determined by the network device based on the historical communication information of the terminal, and may be understood as desired or expected handover lists, to avoid a problem of network instability caused by frequent cell handover of the terminal.

Optionally, preset path information of one fixed route may include at least one cell handover list and/or at least one node handover list. Optionally, the cell handover list includes cell identifiers. Optionally, the cell handover list includes cell performance identifiers. Optionally, the plurality of cell identifiers in the cell handover list may be arranged in a cell handover sequence Optionally, one cell corresponds to one cell identifier. Optionally, one type of cell corresponds to one cell performance identifier. Optionally, the node handover list includes node identifiers Optionally, the node handover list includes node performance identifiers. Optionally, the plurality of node identifiers in the node handover list may be arranged in a node handover sequence. Optionally, one node corresponds to one node identifier. Optionally, one type of node corresponds to one node performance identifier. Optionally, the node handover list includes cell identifiers corresponding to nodes. Optionally, the node handover list includes cell performance identifiers of cells corresponding to nodes. Optionally, the cell handover list and/or the node handover list may assist the terminal 100 in cell handover and/or node handover, thereby reducing a handover failure probability and an RRC reestablishment probability, so as to optimize communication experience of the user.

Optionally, the network device may classify cells on the fixed route based on the historical communication information reported by the at least one terminal, to obtain at least two types of cells through classification. Optionally, the cells may be classified based on network performance. Optionally, the network device may classify nodes on the fixed route based on the historical communication information reported by the at least one terminal, to obtain at least two types of nodes through classification. Optionally, the nodes may be classified based on network performance. Optionally, the nodes may be classified based on a cell classification result.

For example, as shown in FIG. 3, the network device may classify the cells on the first route to obtain three types of cells: first-type cells, second-type cells, and third-type cells. The first-type cells and the second-type cells may be cells with comparatively poor network performance (for example, a cell handover success probability is less than a first threshold, and a call drop probability is greater than or equal to a second threshold), and the third-type cells may be cells with comparatively good network performance (for example, a cell handover success probability is greater than or equal to the first threshold, and a call drop probability is less than the second threshold). In addition, compared with the first-type cells having previous-hop and/or next-hop cells, the second-type cells have no previous-hop and/or next-hop cells.

For example, the network device may classify the nodes on the first route based on the classification result of the cells on the first route, to obtain three types of nodes: a first-type node, a second-type node, and a third-type node. The first-type node may be a node with comparatively poor network performance, and a quantity of first-type cells in the first-type node is greater than or equal to a third threshold. Assuming that the third threshold is 2, the node B is the first-type node. The second-type node may be a node without a previous-hop node and/or next-hop node, and all cells corresponding to the second-type node may be second-type cells. In this case, the node A, a node E, and a node F are second-type nodes. Optionally, the third-type node may be a node with comparatively good network performance, and a quantity of first-type cells in the third-type node is less than the third threshold. Assuming that the third threshold is 2, both the node C and the node D are third-type nodes. It can also be understood that a quantity of third-type cells in the third-type node is greater than or equal to the third threshold.

This is not limited to the foregoing enumerated cases. In specific implementation, alternatively, a ratio of a quantity of first-type cells in the first-type node to a quantity of all cells in the first-type node may be greater than or equal to a fourth threshold, that is, the nodes may be alternatively classified based on ratios of different types of cells in the nodes.

Optionally, in that the second-type cells have no previous-hop and/or next-hop cells, the second-type cell and the previous-hop cell and/or next-hop cell are cells of different nodes. Optionally, a handover relationship between cells belonging to a same node is not used as a basis for cell classification. Optionally, a handover relationship between nodes may be determined based on a handover relationship between cells in the nodes. Optionally, if any cell in a node has no previous-hop cell and/or next-hop cell, it indicates that the node has no previous-hop node and/or next-hop node. Optionally, if there is a handover relationship between at least one cell in a first node and at least one cell in a second node, it indicates that there is a handover relationship between the first node and the second node.

Optionally, it is assumed that the second-type node is a node without a previous-hop node. For example, the node A and the node F shown in FIG. 3 are second-type nodes, and the node E is not a second-type node. Optionally, it is assumed that the second-type node is a node without a next-hop node. For example, the node E and the node F shown in FIG. 3 are second-type nodes, and the node A is not a second-type node. Optionally, a node closest to the start point and/or the end point of the fixed route, that is, the first node and/or the last node in the node handover list, may not be set as a second-type node by default. For example, the node A and the node F shown in FIG. 3 are not second-type nodes, and the node E is a second-type node. A node classification manner is not limited in this application. In FIG. 3, an example in which the node A and the node F are not second-type nodes and the node E is a second-type node is used for description.

Optionally, a cell in the node closest to the start point and/or the end point of the fixed route, that is, a cell in the first node and/or the last node in the node handover list, may not be set as a second-type cell by default. For example, cells in the node A and the node F shown in FIG. 3 are not second-type cells, and cells in the node E are second-type cells. A cell classification manner is not limited in this application.

Optionally, preset path information of one fixed route may include one cell handover list. Optionally, any cell on the first route is in one cell handover list. Optionally, the first cell and the last cell in the cell handover list are second-type cells. Optionally, the first cell and the last cell in the cell handover list are first-type or third-type cells. For a specific example, refer to Table 1 below.

TABLE 1

| Cell handover list of the first route | |
| --- | --- |
| Cell identifier | Cell performance identifier |
| A | good |
| B | good |
| C | bad |
| D | bad |
| E | good |
| F | good |
| G | bad |
| H | good |
| I | break |
| J | break |
| K | good |
| L | bad |

A cell performance identifier corresponding to the first-type cell is "bad", a cell performance identifier corresponding to the second-type cell is "break", and a cell performance identifier corresponding to the third-type cell is "good". In other words, cells C, D, G, and L are the first-type cells, cells I and J are the second-type cells, and cells A, B, E, F, H, and K are the third-type cells.

In Table 1, an example in which the first cell and the last cell in the cell handover list are not second-type cells is used for description.

Optionally, preset path information of one fixed route may include a plurality of cell handover lists. Optionally, in any one of the plurality of cell handover lists, the first cell has no previous-hop cell, and the last cell has no next-hop cell. Optionally, in any cell handover list, the first cell and the last cell are second-type cells. Optionally, in any cell handover list, the first cell and the last cell are first-type or third-type cells. For example, the first route has two cell handover lists:

a cell handover list 1 and a cell handover list 2. For details, refer to Table 2 and Table 3 below.

TABLE 2

| Cell handover list 1 of the first route | |
| --- | --- |
| Cell identifier | Cell performance identifier |
| A | good |
| B | good |
| C | bad |
| D | bad |
| E | good |
| F | good |
| G | bad |
| H | good |
| I | break |
| J | break |

TABLE 3

| Cell handover list 2 of the first route | |
| --- | --- |
| Cell identifier | Cell performance identifier |
| K | good |
| L | bad |

In Table 2 and Table 3, an example in which the first cell in the cell handover list is not a second-type cell is used for description.

Optionally, preset path information of one fixed route may include one node handover list. Optionally, any node on the first route is in one node handover list. Optionally, one node handover list may include cell identifiers corresponding to nodes. Optionally, the first node and the last node in the node handover list are second-type nodes. Optionally, the first node and the last node in the node handover list are first-type nodes or third-type nodes. For a specific example, refer to Table 4 below.

TABLE 4

| Node handover list of the first route | | |
| --- | --- | --- |
| Node identifier | Cell identifier | Node performance identifier |
| A | A | type3 |
| B | B | type1 |
| B | C | type1 |
| B | D | type1 |
| C | E | type3 |
| C | F | type3 |
| C | G | type3 |
| D | H | type3 |
| E | I | type2 |
| E | J | type2 |
| F | K | type3 |
| F | L | type3 |

A node performance identifier corresponding to the first-type node is "type1", a node performance identifier corresponding to the second-type node is "type2", and a node performance identifier corresponding to the third-type node is "type3". In other words, the node B is a first-type node, the node E is a second-type node, and the node A, the node C, the node D, and the node F are third-type nodes.

In Table 4, an example in which the first node and the last node in the node handover list are not second-type nodes is used for description.

Optionally, preset path information of one fixed route may include a plurality of node handover lists. Optionally, one node handover list may include cell identifiers corresponding to nodes. Optionally, in any one of the plurality of node handover lists, the first node has no previous-hop node, and the last node has no next-hop node. Optionally, in any node handover list, the first node and the last node are second-type nodes. Optionally, in any node handover list, the first node and the last node are first-type nodes or third-type nodes. For example, the first route has two node handover lists: a node handover list 1 and a node handover list 2. For details, refer to Table 5 and Table 6 below.

TABLE 5

| Node handover list 1 of the first route | | |
| --- | --- | --- |
| Node identifier | Cell identifier | Node performance identifier |
| A | A | type3 |
| B | B | type1 |
|  | C |  |
|  | D |  |
| C | E | type3 |
|  | F |  |
|  | G |  |
| D | H | type3 |
| E | I | type2 |
|  | J |  |

TABLE 6

| Cell handover list 2 of the first route | | |
| --- | --- | --- |
| Node identifier | Cell identifier | Node performance identifier |
| F | K | type3 |
| F | L |  |

In Table 5 and Table 6, an example in which the first node in the node handover list is not a second-type node is used for description.

Optionally, the preset path information may further include a correspondence between a cell and a node, for example, the node A includes the cell A, and the node B includes the cell B, the cell C, and the cell D.

Optionally, the cell handover list and the corresponding node handover list that are included in the preset path information may be in one handover list (which may be referred to as a cell and node list). Specific examples are shown in Table 7 to Table 9 below.

TABLE 7

| Cell and node list of the first route | | | |
| --- | --- | --- | --- |
| Node identifier | Node performance identifier | Cell identifier | Cell performance identifier |
| A | type3 | A | good |
| B | type1 | B | good |
|  |  | C | bad |
|  |  | D | bad |
| C | type3 | E | good |
|  |  | F | good |
|  |  | G | bad |
| D | type3 | H | good |
| E | type2 | I | break |
|  |  | J | break |
| F | type3 | K | good |
|  |  | L | bad |

The cell and node list shown in Table 7 corresponds to the cell handover list shown in Table 1 above and the node handover list shown in Table 4 above.

TABLE 8

| Cell and node list 1 of the first route | | | |
| --- | --- | --- | --- |
| Node identifier | Node performance identifier | Cell identifier | Cell performance identifier |
| A | type3 | A | good |
| B | type1 | B | good |
|  |  | C | bad |
|  |  | D | bad |
| C | type3 | E | good |
|  |  | F | good |
|  |  | G | bad |
| D | type3 | H | good |
| E | type2 | I | break |
|  |  | J | break |

The cell and node list 1 shown in Table 8 corresponds to the cell handover list 1 shown in Table 2 above and the node handover list 1 shown in Table 5 above.

TABLE 9

| Cell and node list 2 of the first route | | | |
| --- | --- | --- | --- |
| Node identifier | Node performance identifier | Cell identifier | Cell performance identifier |
| F | type3 | K | good |
|  |  | L | bad |

The cell and node list 2 shown in Table 9 corresponds to the cell handover list 2 shown in Table 3 above and the node handover list 2 shown in Table 6 above.

Optionally, the terminal 100 may receive preset path information that is of the first route and that is sent by the network device. Optionally, the terminal 100 receives the preset path information of the first route before passing through the first route. Optionally, the terminal 100 receives the preset path information of the first route when entering the first route. Optionally, the terminal 100 may obtain, in advance based on the preset path information, a cell and node that are to be passed through and that have poor network performance, so as to determine how to cache data.

For example, as shown in FIG. 3, the cell B included in the node B may be a third-type cell. When the terminal 100 is in the cell B, network performance is comparatively good, for example, an accessed network is a 5th generation mobile communications technology (5th generation mobile networks, 5G) network with five signal bars (that is, full bars). The cell C and the cell D included in the node B may be first-type cells. When the terminal 100 is in the cell C and the cell D, network performance is comparatively poor, for example, an accessed network is a 2nd generation mobile telecommunications technology specification (2nd generation wireless telephone technology, 2G) network, or a 5G network with one signal bar. The two cells included in each of the node E and the node F may both be second-type cells. After the terminal 100 leaves the node E, for example, during a period from a location B to a location C, the terminal 100 is in an area of a coverage hole, that is, the terminal 100 cannot access a network, a network disconnection occurs, and a download rate is 0. The terminal 100 cannot re-access the network until the terminal 100 enters the node F (for example, reaches the location C). Optionally, after obtaining the preset path information of the first route, the terminal 100 may cache data when the terminal 100 is to pass through a cell or node in an abnormal area such as weak coverage or a coverage hole. In this way, even if the terminal 100 is in an abnormal area, the user can still normally use online applications such as a video application and an audio application on the terminal 100.

For example, the terminal 100 may cache data in advance before entering the node B or the cell in the node B, or cache data after entering the node B or the cell in the node B. For example, the terminal 100 caches data when the terminal 100 is at the start point, in the node A, or at the location A. Similarly, the terminal 100 may also cache data in advance before entering the node E or the cell in the node E, or cache data after entering the node E or the cell in the node E. For example, the terminal 100 caches data when the terminal 100 is in the node C, in the node D, or in the node E.

It should be noted that forms and quantities of terminals 100, base stations 110, servers 120, servers 130, nodes, and cells shown in FIG. 3 are merely used as examples. This is not limited in this application.

It can be understood that the terminal 100 shown in FIG. 1 may be the terminal 100 shown in FIG. 3, and the network device 200 shown in FIG. 2 may be the base station 110, the server 120, or the server 130 shown in FIG. 3.

The following describes data caching methods provided in embodiments of this application.

FIG. 4 shows a data caching method according to an embodiment of this application. A first terminal in the method may be the terminal 100 shown in FIG. 1, and a network device in the method may be the network device 200 shown in FIG. 2. The method may be applied to the scenario shown in FIG. 3. The method may include but is not limited to the following steps.

S101: The network device receives historical communication information that is of a first route and that is sent by at least one terminal.

Specifically, S101 is an optional step. Optionally, the network device may be a core network device. Optionally, the network device may be an access network device (for example, a base station). Optionally, the network device may be an application server that provides a service for an application. Optionally, an application may be installed on the terminal. The first route is, for example, a fixed traveling route of a vehicle such as a train, a high-speed railway, a subway, or a bus, or a fixed route of daily commuting of a user. For an example of the first route, refer to the first route shown in FIG. 3.

Optionally, the terminal may periodically send the historical communication information of the first route to the network device, for example, send the historical communication information at an interval of a preset time period. Optionally, the terminal may send the historical communication information of the first route to the network device in a triggered manner, for example, once each time cell handover occurs, once each time RRC re-establishment occurs, once each time service freeze occurs, or once each time a service ends. Optionally, the historical communication information that is of the first route and that is sent by the terminal may include but is not limited to at least one of the following: an identifier of a cell (which may be referred to as a serving cell) that provides a service for the terminal on the first route, parameter information (for example, cell broadcast information such as information carried in a master information block (master information block. MIB) or scheduling block (system information block. SIB)) of the serving cell, an identifier indicating whether cell handover of the terminal on the first route succeeds, an identifier indicating whether RRC re-establishment of the terminal on the first route succeeds, an identifier (for example, a service normal identifier and a service freeze identifier) of a service status of the terminal on the first route, service freeze duration of the terminal on the first route, a service delay. RSRP, a signal to interference plus noise ratio (signal to interference plus noise ratio, SINR), reference signal received quality (reference signal received quality, RSRQ), and the like S102: The network device determines preset path information of the first route based on the historical communication information that is of the first route and that is sent by the at least one terminal.

Specifically, S102 is an optional step. Optionally, the preset path information of the first route may include at least one cell handover list and/or at least one node handover list. Optionally, the cell handover list includes cell identifiers. Optionally, the cell handover list includes cell performance identifiers. Optionally, the cell handover list includes node identifiers corresponding to cells. Optionally, the node handover list includes node identifiers. Optionally, the node handover list includes node performance identifiers. Optionally, the node handover list includes cell identifiers corresponding to nodes. Optionally, the node handover list includes cell performance identifiers of cells corresponding to nodes.

Optionally, the network device may obtain the cell identifiers in the cell handover list based on the serving cell identifier sent by the at least one terminal. Optionally, at least one cell identifier in the cell handover list may be arranged in a handover sequence Optionally, the network device may obtain the node identifiers in the node handover list based on the cell handover list and a correspondence between a cell and a node. Optionally, at least one node identifier in the node handover list may be arranged in a handover sequence. Optionally, the correspondence between a cell and a node may be obtained by the network device based on a preset algorithm and the historical communication information. Optionally, the correspondence between a cell and a node may be sent by the terminal to the network device. Optionally, the correspondence between a cell and a node may be preset in the network device.

Optionally, the network device may classify the cells on the first route based on the historical communication information that is of the first route and that is sent by the at least one terminal. Optionally, the network device classifies the cells based on network performance, and identifies a cell with comparatively poor network performance. Optionally, at least two types of cells are obtained through classification. Optionally, different types of cells may be uniquely represented by using different cell performance identifiers, and one type of cell may correspond to one cell performance identifier. An example of cell classification by the network device is as follows:

For example, when a handover failure probability of a first cell is greater than or equal to a first probability threshold (for example, 10%), the network device may determine that the first cell is a first-type cell, that is, a cell with comparatively poor network performance. An expression of the handover failure probability a of the first cell may be as follows:

$$a = \frac{b+c}{b+c+d+e}$$

In the expression, b is a quantity of times the at least one terminal fails to be handed over from another cell to the first cell, c is a quantity of times the at least one terminal fails to be handed over from the first cell to another cell, d is a quantity of times the at least one terminal is successfully handed over from another cell to the first cell, and e is a quantity of times the at least one terminal is successfully handed over from the first cell to another cell.

Optionally, when a failure probability of RRC re-establishment performed when the at least one terminal passes through a first cell is greater than or equal to a second probability threshold, the network device determines that the first cell is a first-type cell. The RRC re-establishment failure probability may be a quantity of RRC re-establishment failures divided by a sum of the quantity of RRC re-establishment failures and a quantity of RRC re-establishment successes Optionally, when a proportion of data service freeze that occurs when the at least one terminal passes through a first cell is greater than or equal to a third probability threshold, the network device determines that the first cell is a first-type cell. The data service freeze proportion may be freeze duration of a first data service divided by use duration of the first data service, for example, freeze duration of video playback divided by total duration of video playback. This is not limited thereto. Alternatively, the data service freeze proportion may be a quantity of times the terminal reports the service freeze identifier when the user uses a first data service divided by a quantity of times the terminal reports the service status identifier. For example, within 100 seconds in which the user plays a video by using a video application, the terminal reports the service status identifier 10 times, that is, once every 10 seconds, and the terminal reports the service freeze identifier twice. In this case, a video service freeze proportion is $2/10=0.5$.

Optionally when a statistical value of a data service delay that occurs when the at least one terminal passes through a first cell is greater than or equal to a fourth probability threshold the network device determines that the first cell is a first-type cell. The statistical value of the data service delay may be a statistical value such as an average value, a median, or a variance of service freeze duration.

Optionally, when a handover failure probability of a first cell is greater than or equal to a first probability threshold, and a proportion of data service freeze that occurs when the at least one terminal passes through the first cell is greater than or equal to a third probability threshold, the network device determines that the first cell is a first-type cell. Optionally, the network device may measure a cell type based on a plurality of indicators. A specific indicator and specific manner of determining a cell type are not limited in this embodiment of this application.

Optionally, based on determining the first-type cell, the network device may identify a second-type cell based on whether there are/is a previous-hop cell and/or next-hop cell. The second-type cell has no previous-hop cell and/or next-hop cell, and the first-type cell has a previous-hop cell and/or next-hop cell. Optionally, the previous-hop cell and next-hop cell are cells that belong to nodes different from that of a current cell. Optionally, that the second-type cell has no previous-hop cell and/or next-hop cell only represents that there is no handover relationship between the second-type cell and a cell in another node, but does not indicate that there is no handover relationship between the second-type cell and a cell in a node in which the second-type cell is located.

Optionally, based on determining the first-type cell, the network device may determine a third-type cell, that is, a cell with comparatively good network performance. Optionally, the network device may determine the third-type cell based on the foregoing manner of determining the first-type cell, but a determining condition is opposite. For example, when a handover failure probability of a first cell is less than a first probability threshold (for example, 10%), the network device may determine that the first cell is a third-type cell.

Optionally, the network device may obtain the first-type cell, the second-type cell, and the third-type cell through classification. When passing through the first-type cell and the third-type cell, the terminal can be handed over to other cells in two different directions. However, when passing through the second-type cell, the terminal can be handed over, in only one direction, to another cell that does not belong to a same node as the second-type cell. Optionally, when the network device passes through the first-type cell, a case such as service freeze easily occurs. Optionally, when the network device passes through the third-type cell, most services are normal. For example, the second-type cell may be located in a coverage hole area such as an area near a tunnel or a remote mountainous area.

Cell classification is not limited to the foregoing example classification case. In specific implementation, the network device may alternatively classify the cells on the first route into a first-type cell and a third-type cell. Alternatively, the network device may further classify third-type cells into a high-quality cell and a common cell. For example, when a cell handover failure probability is less than a fifth probability threshold, a cell is a high-quality cell; when a cell handover failure probability is greater than or equal to the fifth probability threshold and less than a first probability threshold, a cell is a common cell. The fifth probability threshold is less than the first probability threshold. A specific cell classification manner is not limited in this application.

For an example of the cell handover list, refer to Table 1 to Table 3 above. An example of a classification result of cells in one node is shown in Table 10 below.

TABLE 10

| Cell information of a node x1 | | |
|---|---|---|
| Node identifier | Cell identifier | Cell performance identifier |
| x1 | y1 | bad |
| | y2 | bad |
| | y3 | good |
| | y4 | good |

A cell performance identifier corresponding to the first-type cell is "bad", and a cell performance identifier corresponding to the third-type cell is "good". Cells y1 and y2 are first-type cells (that is, cells with comparatively poor network performance), and cells y3 and y3 are third-type cells (that is, cells with comparatively good network performance). There is no second-type cell in the node x1.

This is not limited to the foregoing example case. In specific implementation, the cell performance identifier may be alternatively represented in another form (for example, a number or a letter). For example, a cell performance identifier of the first-type cell is 0. This is not limited in this application.

Optionally, the network device may classify the nodes on the first route based on the historical communication information that is of the first route and that is sent by the at least one terminal. Optionally, the network device classifies the nodes based on network performance, and identifies a node with comparatively poor network performance. Optionally, at least two types of nodes are obtained through classification. Optionally, different types of nodes may be uniquely identified by using different node performance identifiers, and one type of node may correspond to one node performance identifier. An example of node classification by the network device is as follows:

For example, it is assumed that the network device determines that the cells on the first route include a first-type cell, a second-type cell, and a third-type cell. Based on a cell classification result, the network device may classify the nodes on the first route into three types: a first-type node, a second-type node, and a third-type node.

The first-type node may be a node with comparatively poor network performance. Optionally, a quantity of first-type cells corresponding to the first-type node is greater than or equal to a first quantity threshold. Optionally, the first-type node has a previous-hop node and next-hop node in the node handover list of the first route.

The second-type node may also be referred to as a breakpoint. Optionally, all cells corresponding to the second-type node are second-type cells. None of these second-type cells has a previous-hop cell in the cell handover list, or none of these second-type cells has a next-hop cell in the cell handover list. Optionally, the second-type node has no previous-bop node or no next-hop node in the node handover list of the first route. Optionally, for all cells in the second-type node, cell handover fails in a same direction, or cell handover failure probabilities are high in a same direction. For example, the terminal may enter the second-type node after a network is disconnected, that is, after passing through an abnormal area with a coverage hole. Alternatively, the terminal may be disconnected from a network, that is, enter an abnormal area with a coverage hole, after leaving the second-type node. For example, the second-type node is located in a coverage hole area such as an area near a tunnel or a remote mountainous area.

The third-type node may be a node with comparatively good network performance. Optionally, a quantity of first-type cells corresponding to the third-type node is less than a second quantity threshold. Optionally, a quantity of third-type cells corresponding to the third-type node is greater than or equal to a third quantity threshold.

Node classification is not limited to the foregoing example case. In specific implementation, the network device may alternatively classify the nodes on the first route into a first-type node and a third-type node. Alternatively, the network device may further classify third-type nodes into a fourth-type node and a fifth-type node. A quantity of third-type cells corresponding to the fourth-type node is greater than or equal to a fourth quantity threshold, and a quantity of third-type cells corresponding to the fifth-type node is less than the fourth quantity threshold and greater than or equal to a fifth quantity threshold. The fifth quantity threshold is greater than the fourth quantity threshold. Alternatively, a quantity of high-quality cells corresponding to the fourth-type node is greater than or equal to a sixth quantity threshold, and a quantity of common cells corresponding to the fifth-type node is greater than or equal to a seventh quantity threshold. A specific node classification manner is not limited in this application.

For an example of the node handover list, refer to Table 4 to Table 6 above. Optionally, the node handover list may further include a distance identifier. Optionally, the distance identifier is used to indicate a quantity of nodes between any node on the first route and a second-type node (that is, a breakpoint, optionally a breakpoint to be subsequently passed through rather than a breakpoint previously passed through), and is used to indicate a quantity of nodes yet to be passed through before reaching the breakpoint. For a specific example, refer to Table II below.

TABLE 11

| Node handover list of the first route | | |
| Node identifier | Distance identifier | Node performance identifier |
| --- | --- | --- |
| x1 | 5 | type2 |
| x2 | 4 | type1 |
| x3 | 3 | type3 |
| x4 | 2 | type3 |
| x5 | 1 | type1 |
| x6 | 0 | type2 |

A node performance identifier corresponding to the first-type node is "type1", a node performance identifier corresponding to the second-type node is "type2", and a node performance identifier corresponding to the third-type node is "type3". Nodes x2 and x5 are first-type nodes (that is, nodes with comparatively poor network performance), nodes x1 and x6 are second-type nodes (that is, breakpoints), and nodes x3 and x4 are third-type nodes (that is, nodes with comparatively good network performance). The node x1 may be a start point of the first route, and the node x6 may be an end point of the first route.

For example, a distance identifier of the node x2 is 4, indicating that a terminal in the node x2 needs to pass through four nodes to reach the breakpoint (that is, the node x6).

Optionally, the terminal may determine a caching policy based on the distance identifier. Optionally, when a distance identifier corresponding to a node at which the terminal is currently located is less than or equal to a preset distance value, the terminal may start to cache data from the node at which the terminal is currently located.

Optionally, the terminal may determine a caching policy based on a speed of the terminal and the distance identifier. Optionally, the speed of the terminal may be determined based on duration of camping on a node already passed through by the terminal. Optionally, the speed may be numerically equal to a ratio of a quantity of nodes passed through by the terminal to a time for passing through these nodes, and may be understood as a quantity of nodes passed through per second, expressed in nodes per second (nodes/second). The speed of the terminal is not limited thereto. Alternatively, the speed of the terminal may be determined by the terminal based on a detection module (for example, a GPS location determining module or an acceleration sensor) on the terminal. A manner of determining the speed of the terminal is not limited in this application. Optionally, when the speed of the terminal is less than or equal to a first speed threshold, and a distance identifier corresponding to a node at which the terminal is currently located is less than or equal to a first distance value, the terminal may start to cache data from the node at which the terminal is currently located. When the speed of the terminal is greater than a first speed threshold, and a distance identifier corresponding to a node at which the terminal is currently located is less than or equal to a second distance value, the terminal may start to cache data from the node at which the terminal is currently located. The first distance value is less than the second distance value. For example, on the first route shown in FIG. 3, both a terminal A and a terminal B have passed through the node A and the node B. A sum of camping duration of the terminal A on the node A and the node B is 5 minutes, and a sum of camping duration of the terminal B on the node A and the node B is 10 minutes. The terminal A may start to cache data when the terminal A is one node away from the node E, that is, start to cache data when entering the node D. The terminal B may start to cache data when the terminal B is two nodes away from the node E, that is, start to cache data when entering the node C.

Optionally, the terminal may determine a caching policy with reference to a caching capability of the terminal and the distance identifier. For example, it is assumed that the caching capability of the terminal is that caching can be performed a maximum of four nodes in advance. When the terminal is currently located at the node x1 shown in Table II above, a distance identifier corresponding to the node x1 is 5, which is higher than the caching capability of the terminal. Therefore, the terminal may not cache data when the terminal is located at the node x1. When the terminal is located at the node x2, the distance identifier corresponding to the node x2 is 4, which is equal to the caching capability of the terminal. Therefore, the terminal may start to cache data when the terminal is located at the node x2, that is, start to cache data four nodes in advance. Optionally, the network device may determine a maximum value of the distance identifier based on a caching capability of the at least one terminal that sends the historical communication information. Optionally, the network device may determine a maximum value of the distance identifier based on a caching capability of a preset quantity of terminals in the at least one terminal. A ratio of the preset quantity to a quantity of the at least one terminal is greater than a preset ratio. Optionally, the network device may determine a maximum value of the distance identifier based on an average caching capability of the at least one terminal. For example, when the average caching capability is that caching can be performed four nodes in advance, the network device may set the maximum value of the distance identifier to 4. When a quantity of nodes between a node and the breakpoint is greater than 4, a distance identifier of the node may be represented by an identifier such as "not applicable" (not applicable, N/A). For example, in Table 3 above, the distance identifier of the node x1 may be set to N/A. A manner of representing the distance identifier is not limited in this application.

Optionally, the terminal may determine a caching policy with reference to a caching capability of the terminal and the distance identifier. For example, it is assumed that distance identifiers corresponding to the node x1 and the node x2 are N/A. When the terminal is located at the node x1 and the node x2, the terminal may determine, based on the distance identifiers, not to cache data. When the terminal is located at the node x3, a distance identifier corresponding to the node x3 is not N/A, and the terminal may determine whether the distance identifier corresponding to the node x3 is equal to or less than the caching capability of the terminal. If the distance identifier is equal to or less than the caching capability, the terminal starts to cache data. If the distance identifier is not equal to or less than the caching capability, the terminal may not cache data and when the terminal is located at the node x4 subsequently, the terminal determines whether a distance identifier corresponding to the node x4 is equal to or less than the caching capability of the terminal.

This is not limited to the foregoing enumerated cases. In specific implementation, the node performance identifier may be alternatively represented in another form (for example, a number or a letter). For example, a node performance identifier corresponding to the first-type node is a, a node performance identifier corresponding to the second-type node is b, and a node performance identifier corresponding to the third-type node is c. This is not limited in this application.

S103: The network device determines camping duration on the first route based on the historical communication information that is of the first route and that is sent by the at least one terminal.

Specifically, S103 is an optional step. Optionally, the camping duration on the first route may include average duration of camping on each cell on the first route and/or average duration of camping on each node on the first route. Optionally, the network device may collect statistics about camping duration of the at least one terminal on any cell on the first route, and calculate an average value. The average value is average duration of camping on the cell Optionally, the network device may collect statistics about camping duration of the at least one terminal on any node on the first route, and calculate an average value. The average value is average duration of camping on the node.

S104: The network device sends the preset path information of the first route and the camping duration on the first route to the first terminal.

Optionally, in S104, the network device may alternatively send only the preset path information of the first route to the first terminal.

Specifically, S104 is an optional step.

S105: The first terminal determines a target caching policy based on the preset path information of the first route and the camping duration on the first route, and caches data by using the target caching policy.

Optionally in S105, the first terminal may alternatively determine a target caching policy based on only the preset path information of the first route.

In a specific implementation process, the first terminal may determine a current location of the first terminal based on at least one of a cell in which the first terminal is currently located, a node at which the first terminal is currently located, or a positioning technology such as GPS. The first terminal may predict a movement direction based on the current location of the first terminal and a cell handover list and/or node handover list in preset path information, of at least one route, sent by the network device, so as to determine whether the first terminal is to subsequently pass through an abnormal area such as weak coverage or a coverage hole. A manner of determining the preset path information, of the at least one route, sent by the network device is the same as that of determining the preset path information of the first route in S102. Details are not described again.

Optionally, when determining that the first terminal is to subsequently pass through an abnormal area, the first terminal may determine the target caching policy. Optionally, when the first terminal determines that the first terminal is to subsequently pass through an abnormal area. the first terminal may determine the target caching policy with reference to a service type and camping duration. Optionally, the target caching policy is a first caching policy or a second caching policy. The first caching policy is that the first terminal caches data before entering an abnormal area. The second caching policy is that the first terminal caches data after entering an abnormal area. The first caching policy and the second caching policy are specifically described as follows:

Optionally, the first caching policy may be applied to a case in which duration for which the first terminal passes through an abnormal area is greater than a preset duration threshold, for example, the first terminal is to subsequently pass through a plurality of consecutive first-type cells, or duration for which the first terminal subsequently passes through a first-type cell is comparatively long. Optionally, the first caching policy may be applied to a case in which an abnormal area to be passed through by the first terminal is a coverage hole area, that is, the first terminal cannot access a network when passing through the abnormal area. Optionally, a coverage hole area usually follows the second-type node that has no next-hop node, and therefore, the first terminal may cache data by using the first caching policy when determining that a node to be subsequently passed through includes the second-type node.

Optionally, the first terminal may determine a caching start moment $t_0$ and a caching end moment $t_1$ based on the first caching policy. Optionally, a caching capability of the first terminal is limited (for example, storage space is limited), and there is maximum duration $t_{max}$ for which data can be cached. The first terminal may determine $t_0$ and $t_1$ based on average duration $k_i$ of camping on a cell that is to be subsequently passed through and/or average duration $k_j$ of camping on a node that is to be subsequently passed through, and $t_{max}$, where i and j are positive integers. A minimum value of i is 1, and a maximum value of i is a quantity of the cells on the first route. A minimum value of j is 1, and a maximum value of j is a quantity of the nodes on the first route.

For example, it is assumed that a route through which the first terminal passes is the first route, the node handover list of the first route is the node handover list shown in Table 11 above, the first terminal is currently located at the node x1, and a current moment is $t_b$. The first terminal may determine, based on the node at which the first terminal is currently located and the node handover list, that the first terminal is to subsequently pass through the node x6. In this case, the first terminal caches data in advance. The first terminal may determine that the caching end moment is a moment at which the first terminal arrives at the node x6, or the caching end moment may be a moment at which the first terminal leaves the node x6. Assuming that the first terminal determines that the caching end moment $t_1$ is the moment $k_2$ at which the first terminal arrives at the node x6, the caching end moment $t_1$ is as follows:

$$t_1 = k_2 = t_b + \sum_{j=1}^{j=5} k_j$$

In this case, the caching start moment is $t_0 = t_1 - t_{max}$.

Optionally, the first terminal has a comparatively strong caching capability (for example, large storage space), and can keep caching data. The first terminal may determine $t_0$ and $t_1$ according to a preset rule or based on a service type.

For example, the preset rule is caching data when arriving at a preset node or a preset cell (for example, the first-type node or the first-type cell), or starting to cache data a first quantity of nodes or cells in advance. The preset rule is stopping data caching when network performance is comparatively poor (for example, cell handover fails or RRC re-establishment fails). Alternatively, the preset rule is that caching duration is average duration of camping on a second quantity of nodes or cells, that is, stopping caching after caching is performed on a second quantity of nodes or cells. Alternatively, the preset rule is caching for first preset duration, that is, stopping caching after caching is performed for the first preset duration.

For example, when a current service is a service of a first service type, the first terminal may start to cache data a third quantity of nodes or cells in advance, and stop data caching when network performance is comparatively poor. When a current service is a service of a second service type, the first terminal may start to cache data a fourth quantity of nodes or cells in advance, and stop data caching when network performance is comparatively poor. The service of the first service type is a service with a comparatively high requirement on quality of service (quality of service, QoS), for example, a service of an application such as a video application or a game application. The service of the second service type is a service with a comparatively low QoS requirement, for example, a service of an application such as an ebook or a browser. The third quantity is greater than the fourth quantity.

Optionally, the second caching policy may be applied to a case in which duration for which the first terminal passes through an abnormal area is less than a preset duration threshold, for example, duration for which the first terminal subsequently passes through a first-type cell is comparatively short. The first terminal may determine a caching start moment $t_0$ and a caching end moment $t_1$ based on the second caching policy. $t_0$ may be a moment $t_c$ at which the first terminal arrives at a target cell (for example, a closest cell in first-type cells to be subsequently passed through), or may be a moment after the first terminal enters a target cell. An expression of the caching start moment $t_0$ is as follows:

$$t_0 = t_c + \alpha \times t_d$$

In the expression, $t_d$ is average duration of camping on the target cell, and $\alpha$ is a preset value greater than or equal to 0 and less than 1, for example, 0, $\frac{1}{5}$, $\frac{1}{4}$, $\frac{1}{3}$, or $\frac{1}{2}$.

In this case, the caching end moment $t_1 = t_0 + t_e$, where $t_e$ is preset caching duration.

In some embodiments, the first terminal may determine, based on a service status, an amount of data that needs to be cached, so as to determine minimum caching duration $t_{min}$. In this case, $t_e \geq t_{min}$ needs to be met. To ensure $t_e \geq t_{min}$, the first terminal may determine a based on $t_{min}$, so as to meet a service requirement. Optionally, if $t_d < t_{min}$, the first terminal may not cache data.

Optionally, the target caching policy may include but is not limited to at least one of the following: increasing a download rate, and reducing an amount of downloaded data used per unit time, for example, reducing a bit rate, a resolution, or a frame rate of downloaded video data, and reducing a sampling rate, a sampling resolution, or a quantity of sound channels of downloaded audio data.

This is not limited to the foregoing enumerated cases. In specific implementation, alternatively, the first terminal may directly set data caching to be performed after second preset duration after arriving at a target cell. A specific data caching manner is not limited in this application.

In the method shown in FIG. 4, when passing through the first route, the first terminal may obtain, in advance based on the preset path information that is of the first route and that is sent by the network device, a cell and/or node that are/is to be passed through and that have/has comparatively poor network performance, determine the target caching policy based on an actual status, and cache data based on the target caching policy. This reduces service freeze caused by poor network performance due to a network deployment defect or poor signal coverage, thereby improving user experience. In the method, the preset path information that is of the first route and that is sent by the network device may be determined based on the historical communication information reported by the at least one terminal. In this way, even if a quantity of times a single terminal passes through the first route is comparatively small, the first terminal can still obtain a more accurate network status of the first route, thereby better performing data caching In addition, for an abnormal area (for example, a single first-type cell) whose passing-through duration is comparatively short, the first terminal may further cache data after entering the abnormal area, instead of caching data in advance. This reduces unnecessary power consumption of the terminal and waste of resources while ensuring service quality, so that product competitiveness is improved.

In some embodiments, the first terminal may alternatively independently determine camping duration on the first route. A specific procedure example is shown in FIG. 5 below.

FIG. 5 shows another data caching method according to an embodiment of this application. A first terminal in the method may be the terminal 100 shown in FIG. 1, and a network device in the method may be the network device 200 shown in FIG. 2. The method may be applied to the scenario shown in FIG. 3. The method may include but is not limited to the following steps.

S201: The network device receives historical communication information that is of a first route and that is sent by at least one terminal.

S202: The network device determines preset path information of the first route based on the historical communication information that is of the first route and that is sent by the at least one terminal.

Specifically, S201 and S202 are the same as S101 and S102 in FIG. 4, and details are not described again.

S203: The network device sends the preset path information of the first route to the first terminal.

Specifically, S203 is an optional step.

S204: The first terminal determines camping duration on the first route based on historical communication information of the first terminal.

Specifically, S204 is an optional step. Optionally, a description of the camping duration on the first route is the same as that of the camping duration on the first route in S103 in FIG. 4, and details are not described again.

S205: The first terminal determines a target caching policy based on the preset path information of the first route, and caches data by using the target caching policy.

Specifically, S205 is the same as S105 in FIG. 4, and details are not described again.

The following describes an example of an implementation of S105 shown in FIGS. 4 and S205 shown in FIG. 5.

FIG. 6 shows still another data caching method according to an embodiment of this application. The method may be applied to the terminal 100 shown in FIG. 1. The method may be applied to the scenario shown in FIG. 3. The method may include but is not limited to the following steps.

S301: A first terminal determines a current location of the first terminal and a movement direction of the first terminal.

Specifically, S301 is an optional step. Optionally, the first terminal may determine the current location of the first terminal based on at least one of a cell in which the first terminal is currently located, a node at which the first terminal is currently located, or a positioning technology such as GPS. Optionally, the first terminal may predict the movement direction based on the current location of the first terminal and a cell handover list and/or node handover list in preset path information, of at least one route, sent by a network device.

S302: The first terminal determines whether a node to be subsequently passed through includes a second-type node.

Specifically, S302 is an optional step. Optionally, the first terminal determines, with reference to the current location of the first terminal and the predicted movement direction, a target route that is to be passed through. Optionally, the first terminal determines, based on the node at which the first terminal is currently located and a node handover list of the target route, whether a node to be subsequently passed through includes a second-type node. For a description of the second-type node, refer to the description of S102 in FIG. 4. Optionally, if the node to be subsequently passed through includes the second-type node, the first terminal performs S303; or if the node to be subsequently passed through includes no second-type node, the first terminal performs S304.

S303: If the node to be subsequently passed through includes the second-type node, the first terminal determines a caching start moment and a caching end moment based on a first caching policy.

Specifically, S303 is an optional step. For a description of how the first terminal determines the caching start moment and the caching end moment based on the first caching policy, refer to the description of S105 in FIG. 4. Optionally, the first terminal performs S306 after performing S303.

S304: If the node to be subsequently passed through includes no second-type node, the first terminal determines whether the first terminal enters a first-type cell.

Specifically, S304 is an optional step. Optionally, the first terminal determines, based on cell information in preset path information of the target route, whether an entered cell is the first-type cell. Optionally, if it is determined that the entered cell is the first-type cell, the first terminal performs S305; or if it is determined that the entered cell is not the first-type cell, the first terminal does not cache data.

S305: If entering the first-type cell, the first terminal determines a caching start moment and a caching end moment based on a second caching policy.

Specifically, S305 is an optional step. For a description of how the first terminal determines the caching start moment and the caching end moment based on the second caching policy, refer to the description of S105 in FIG. 4. Optionally, the first terminal performs S306 after performing S305

S306: The first terminal caches data based on the determined caching start moment and caching end moment.

In some embodiments, the first terminal may store preset path information of at least one route. Optionally, the preset path information of the at least one route may be stored in the first terminal when the first terminal is delivered from a factory. Optionally, the preset path information of the at least one route may be subsequently obtained by the first terminal.

In some embodiments, the first terminal may receive preset path information that is of a first route and that is sent by the network device. Optionally, the first terminal may send, to the network device, network information of a cell in which the first terminal is located. Optionally, the network device may preset preset path information of one or more routes, and the network device may determine the preset path information of the first route based on the network information of the cell in which the first terminal is located. Optionally, the network information of the cell may include a cell identifier. Optionally, the preset path information of the first route includes cell identifiers of a plurality of cells on the first route, and one of the plurality of cell identifiers is the same as the identifier of the cell in which the first terminal is located.

In some embodiments, the first terminal may receive preset path information of a plurality of routes, sent by the network device. Optionally, the first terminal may determine preset path information of a first route from the preset path information of the plurality of routes based on network information of a cell in which the first terminal is located. Optionally, the preset path information of the first route includes cell identifiers of a plurality of cells on the first route, and one of the plurality of cell identifiers is the same as an identifier of the cell in which the first terminal is located.

In some embodiments, preset path information, of at least one route, stored in the first terminal may be updated preset path information. Optionally, the network device may periodically send preset path information of at least one route to the first terminal. Optionally, the network device may send preset path information of at least one route to the first terminal after the preset path information of the at least one route is updated, which may be understood as that the network device may send the preset path information of the at least one route to the first terminal in a triggered manner.

In some embodiments, the preset path information of the first route may further include a line identifier. For example, the preset path information of the first route includes a line identifier 1, and preset path information of a second route includes a line identifier 2.

This is not limited to the foregoing example case in which the terminal independently determines caching. In specific implementation, the terminal may alternatively cache data under an indication of the network device. Optionally, the network device may not send the preset path information of the first route to the terminal. Optionally, the network device may obtain network information of a cell in which the terminal is located. For example, the network device is a core network device, and a base station corresponding to the cell in which the terminal is located may send, to the network device, the network information of the cell in which the terminal is located. Optionally, the network device may determine the preset path information of the first route based on the network information of the cell in which the terminal is located. Optionally, the network information of the cell may include a cell identifier. Optionally, the preset path information of the first route includes cell identifiers of a plurality of cells on the first route, and one of the plurality of cell identifiers is the same as the identifier of the cell in which the first terminal is located. Optionally, the network device may determine, based on the network information of the cell in which the terminal is located and the preset path information of the first route, whether a node to be subsequently passed through by the terminal on the first route includes a node with comparatively poor network performance, for example, the foregoing first-type node and second-type node. Optionally, the network device may send third indication information to the terminal when determining that the node to be subsequently passed through by the terminal on the first route includes a node with comparatively poor network performance. Optionally, when the node to be subsequently passed through by the terminal on the first route includes a node with comparatively poor network performance and the terminal is at a first node on the first route, the network device may send third indication information to the terminal. A quantity of nodes between the first node and a second node is less than or equal to a preset threshold. The second node is a node, determined by the network device, that is to be subsequently passed through by the terminal on the first route and that has comparatively poor network performance. Optionally, the terminal may cache data based on the third indication information. Optionally, a first application on the terminal caches data based on the third indication information. Optionally, the first application is a foreground application. Optionally, the network device may send duration of camping on a plurality of nodes on the first route to the terminal. Optionally, the terminal itself may determine duration of camping on a plurality of nodes on the first route. Optionally, the network device may send duration of camping on the first node to the terminal. Optionally, the terminal itself may determine duration of camping on the first node. Optionally, the network device may send duration of data caching to the terminal. Optionally, the terminal itself may determine duration of data caching. Optionally, the duration of data caching may be determined based on duration of camping on the second node. Optionally, the duration of data caching may be determined based on the duration of camping on the first node and duration of camping on a node between the first node and the second node. Optionally, the network device may perform at least one of S301 to S305 shown in FIG. 6. Optionally, the network device is an application server of the first application. When determining that the node to be subsequently passed through by the terminal on the first route includes a node with comparatively poor network performance, the network device may send data of the first application to the terminal, and the terminal does not need to request to perform caching.

Figure 7:
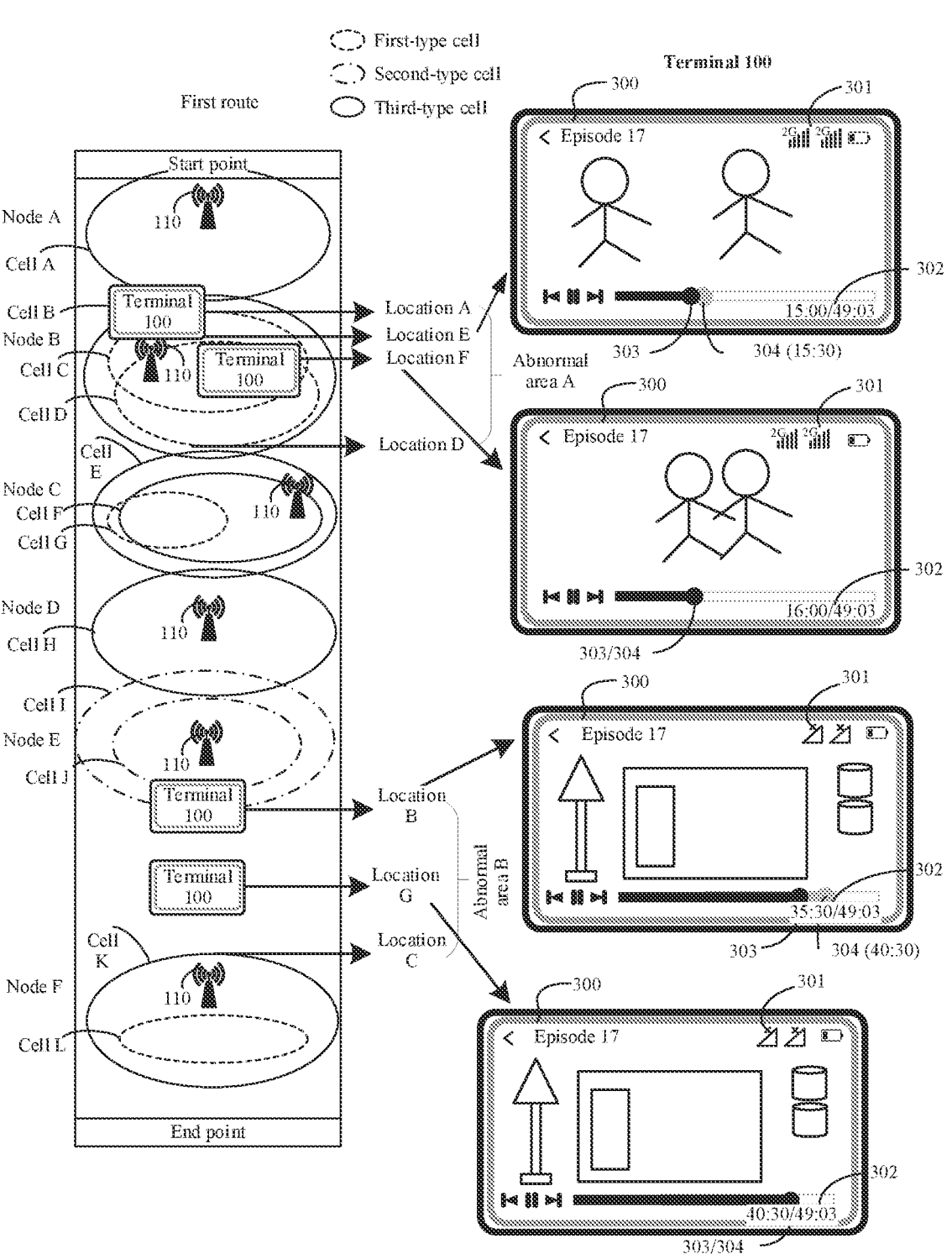
FIG. 7 to FIG. 11 are schematic diagrams of some other data caching scenarios according to embodiments of this application.
Figure 8:
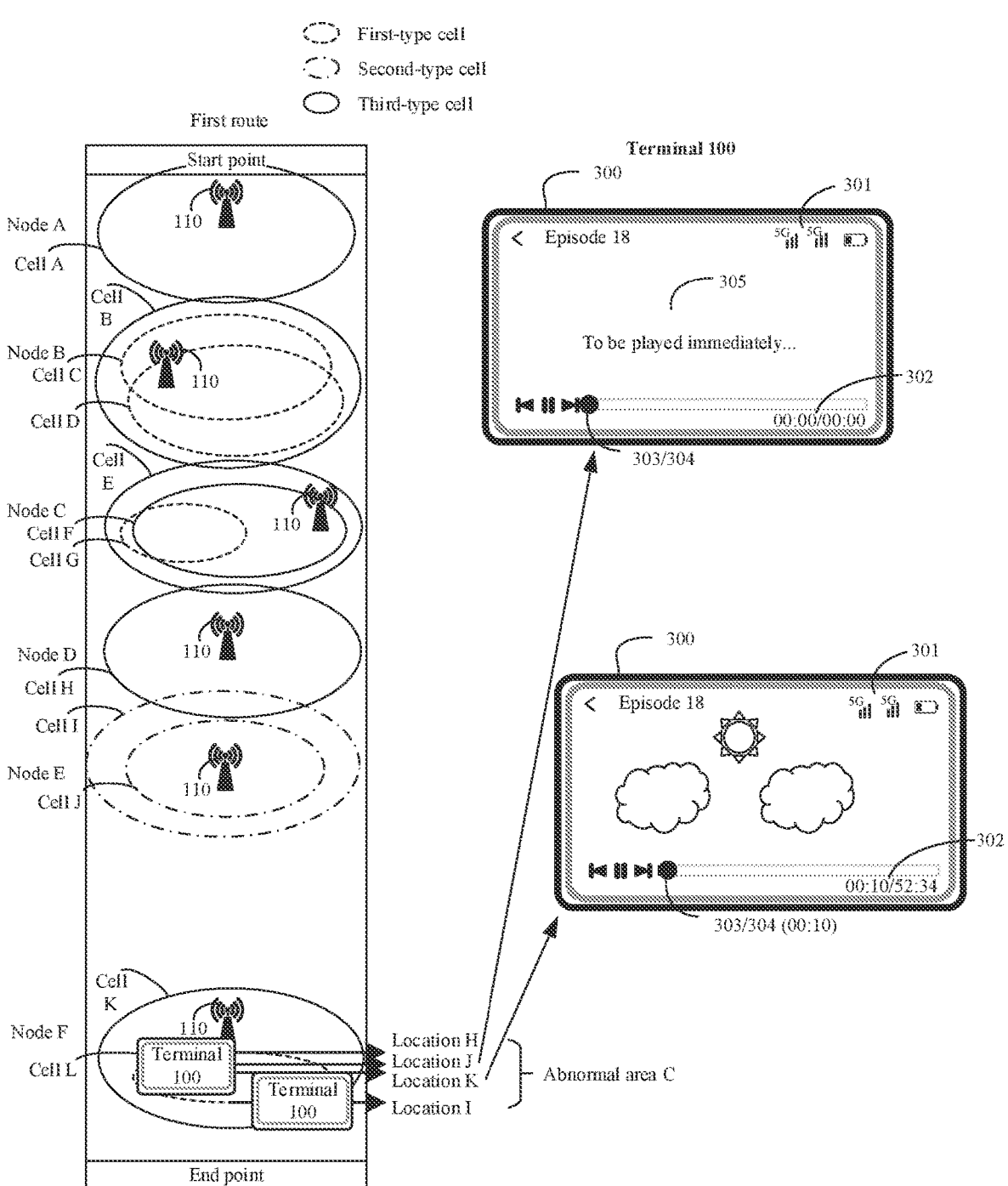

An example of a scenario in which a user passes through an abnormal area on a fixed route is first described. Details are shown in FIG. 7 and FIG. 8. For related descriptions of a first route, a terminal 100, a base station 110, and the like in the scenario, refer to the descriptions in FIG. 3. Details are not described again.

FIG. 7 is an example of another schematic diagram of a data caching scenario.

As shown in FIG. 7, the user sets off from a start point of the first route, and a destination is an end point of the first route. When passing through the first route, the user may start a video application on the terminal 100, and watch a video by using the video application. When the user is passing through a normal area (for example, in a node A or in a node D) on the first route, the terminal 100 accesses a cell with comparatively good network performance (that is, a third-type cell). Therefore, a service of the terminal 100 is normal, for example, there is no freeze or a freeze time is short (for example, less than 3 seconds) when the video application plays a video. When the user is passing through an abnormal area on the first route, there is a high probability that the terminal 100 encounters a network service exception. The abnormal area may be an area covered by a cell with comparatively poor network performance (that is, a first-type cell or a second-type cell), for example, an abnormal area A in which a cell C and cell D in a node B are located, or may be an area without coverage, for example, an abnormal area B between a node E and a node F. The network service exception may include but is not limited to: no network signal (that is, network disconnection), falling to a low network standard (for example, falling from 5G to 2G), comparatively poor signal quality, and comparatively poor application experience quality. The "comparatively poor signal quality" may be that a parameter used to represent signal quality (referred to as a signal quality parameter below) does not meet a preset condition. For example, a signal-to-noise ratio, RSRP, or reference signal received quality (reference signal received quality. RSRQ) is less than a preset quality threshold, and a packet loss rate is greater than a preset quality threshold. The "comparatively poor application experience quality" may be that, for example, quality of experience (quality of experience, QoE) is less than a first QoE level. A lower QoE level indicates poorer user experience. For example, there are three QoE levels: 0, 1, and 2, where 0 indicates poor user experience, 1 indicates average user experience, and 2 indicates good user experience. The first QoE level is 2, and an abnormal area is an area whose QoE level is 0 or 1. For example, on a user interface, comparatively poor signal quality and comparatively poor application experience quality may be represented as that a quantity of signal bars of network access is not full. For example, a full quantity of signal bars is 5, and a quantity of signal bars of network access is 2.

It is assumed that, when the user is in a normal area, the terminal 100 caches video data of the video application by using a third caching policy. The third caching policy may be specifically as follows: When playback duration of downloaded video data is less than or equal to first use duration (for example, 30 seconds), the terminal 100 caches video data based on a first download rate, where the first download rate is that video data whose playback duration is 10 seconds is downloaded per second. When playback duration of downloaded video data is equal to second use duration (for example, 300 seconds, that is, 5 minutes), the terminal 100 stops caching video data. In other words, video data of the second use duration is cached each time, and when use duration of a remaining amount of cached data is less than or equal to the first use duration, video data continues to be cached. Therefore, a caching start moment determined by the third caching policy is a moment at which the terminal 100 determines that playback duration of downloaded video data is less than or equal to the first use duration, and a caching end moment is a moment at which the terminal 100 determines that playback duration of downloaded video data is equal to the second use duration. This is not limited to the foregoing example case. In specific implementation, the first use duration and the second use duration may alternatively be other values. In this case, if the user passes through an abnormal area, video service freeze is likely to occur. A specific example is as follows:

As shown in FIG. 7, when the user is passing through the abnormal area A, the terminal 100 accesses a first-type cell (for example, the cell C or the cell D). When the terminal 100 is at any location between a location A and a location D (that is, within the abnormal area A), the terminal 100 may encounter cases such as falling to a low network standard, comparatively poor signal quality, and comparatively poor application experience quality. It is assumed that, when the terminal 100 is at any location between the location A and a location E, a network service is normal, that is, the terminal 100 accesses a 5G network with five signal bars (that is, full bars); and when the terminal 100 is at any location between the location E and the location D, the terminal 100 falls to a low network standard.

As shown in FIG. 7, when the user is at the location E in the abnormal area A, the terminal 100 displays a user interface 300 of the video application. The user interface 300 may include a signal quality identifier 301, a time identifier 302, a playback duration identifier 303, and a caching duration identifier 304. The signal quality identifier 301 is used to represent that the terminal 100 currently accesses a 2G network with five signal bars (that is, full bars). Compared with the 5G network accessed when the terminal 100 is located between the location A and the location E, in this case, the terminal 100 has fallen to a low network standard. The time identifier 302 is "15:00/49:03", where "49:03" is used to indicate that total duration of a video (that is, a video of the seventeenth episode) currently played by the video application is 49 minutes and 3 seconds, and "15:00" is used to indicate that an image currently played by the video application is an image of the video at 15 minutes. Corresponding to the time identifier 302, the playback duration identifier 303 is also used to indicate that currently the video has been played to 15 minutes. The caching duration identifier 304 is used to indicate that currently data has been cached to 15 minutes and 30 seconds. Because a difference between the playback duration identifier 303 and the caching duration identifier 304 is equal to 30 seconds, that is, playback duration of downloaded video data is less than or equal to the first use duration, the terminal 100 may determine that this moment is the caching start moment, and cache video data by using the third caching policy. However, because the 2G network is accessed in this case, a download rate of the terminal 100 is far less than the first download rate. It is assumed that, when the terminal 100 accesses the 2G network, the download rate decreases to that video data whose playback duration is 0.5 second is downloaded per second (which may be referred to as a second download rate). When the user continues to travel from the location E for 1 minute and arrives at a location F, the playback duration identifier 303 and the caching duration identifier 303 in the user interface 300 move, and the time identifier 302 also changes. When the user arrives at the location F, the playback duration identifier 303 is used to indicate that currently the video has been played to 16 minutes, and the caching duration identifier 304 is used to indicate that currently data has been cached to 16 minutes In this case, the playback duration identifier 303 coincides with the caching duration identifier 304, and video freeze occurs. In a subsequent process in which the user continues to travel from the location F to the location D, the terminal 100 is still in the abnormal area A, and has a problem of falling to a low network standard. Even if the download rate is higher than the second download rate, the download rate is still far below the first download rate. Therefore, freeze easily occurs during subsequent video playback, and user experience is comparatively poor.

As shown in FIG. 7, when the terminal 100 is at any location between a location B and a location C (that is, within the abnormal area B), the terminal 100 cannot access a network, and network disconnection occurs. In this case, the download rate is 0. For example, when the user leaves the node E, that is, when the user is at the location B in the abnormal area B, the signal quality identifier 301 in the user interface 300 displayed by the terminal 100 is used to represent that the terminal 100 cannot access a network currently and network disconnection occurs. In this case, the download rate is 0. In this case, the time identifier 302 in the user interface 300 changes to "35:30/49:03", where "35:30" corresponds to the playback duration identifier 303, and both "35:30" and the playback duration identifier 303 are used to indicate that an image currently played by the video application is an image of the video at 35 minutes and 30 seconds. The caching duration identifier 304 is used to indicate that currently data has been cached to 40 minutes and 30 seconds. Because a difference between the playback duration identifier 303 and the caching duration identifier 304 is equal to 5 minutes, that is, playback duration of downloaded video data is equal to the second use duration, this moment is determined as the caching end moment by the terminal 100. When the terminal 100 continues to travel from the location B for 5 minutes and arrives at a location G, the playback duration identifier 303 in the user interface 300 moves, and the time identifier 302 also changes. However, in this case, because the terminal 100 is still in the abnormal area B, the download rate is 0, and the terminal 100 cannot download video data, the caching duration identifier 303 remains unchanged. In this case, the playback duration identifier 303 coincides with the caching duration identifier 304, and video freeze occurs. In a subsequent process in which the terminal 100 travels from the location G to the location C, because the terminal 100 is still in the abnormal area B, the terminal 100 still cannot download video data, and consequently, the user cannot continue watching the video. Correspondingly, the play back duration identifier 303, the caching duration identifier 304, and the time identifier 302 in the user interface 300 also remain unchanged. Only when the terminal 100 leaves the abnormal area B, that is, arrives at the location C, the terminal 100 can establish a connection to and communication with the base station 110 in the node F, and access a cell in the node F, so as to continue to download video data for the user to watch. For a comparatively long time (that is, when the user is located between the location G and the location C), the user cannot normally use the video application. Experience is comparatively poor.

FIG. 8 is an example of still another schematic diagram of a data caching scenario. The scenario shown in FIG. 8 is the same as the scenario shown in FIG. 7, and details are not described again.

As shown in FIG. 8, there is further an abnormal area C on the first route. The abnormal area C may be an area covered by a cell with comparatively poor network performance (that is, a first-type cell) in the node F. When the user is passing through the abnormal area C, the terminal 100 accesses the first-type cell. When the terminal 100 is at any location between a location H and a location I (that is, within the abnormal area C), the terminal 100 may encounter cases such as falling to a low network standard, comparatively poor signal quality, and comparatively poor application experience quality. It is assumed that, when the terminal 100 is at any location between the location H and a location J, a network service is normal; and when the terminal 100 is at any location between the location J and the location I, signal quality is comparatively poor. This is not limited thereto. In specific implementation, when the terminal 100 is at any location in the abnormal area C, the terminal 100 may directly drop a call. For example, when the terminal 100 is at any location between the location J and the location I, a call drop occurs.

As shown in FIG. 8, it is assumed that the user continues watching the video of the seventeenth episode when the user is located between the location H and the location J, and the user taps a next episode when the user arrives at the location J. In this case, the video application has not yet played video data of the next episode (that is, the eighteenth episode). Therefore, the user interface 300 further includes a notification 305: "to be played immediately . . . " to notify the user that a video of the eighteenth episode is to be played. The time identifier 302 in the user interface 300 has not been successfully obtained yet, and therefore is "00:00/00:00". The playback duration identifier 303 coincides with the caching duration identifier 304, to indicate that a current played amount and a current cached amount are both 0. The signal quality identifier 302 in the user interface 300 is used to represent that the terminal 100 currently accesses a 5G network with three signal bars (a full quantity of signal bars is 5), and signal quality is comparatively poor. Therefore, the download rate of the terminal 100 is less than the first download rate. It is assumed that, when signal quality is comparatively poor, the download rate of the terminal 100 decreases to that video data whose playback duration is 1 second is downloaded per second (which may be referred to as a third download rate). When the user travels from the location J for 10 seconds and arrives at a location K, the playback duration identifier 303 and the caching duration identifier 303 in the user interface 300 move, and the time identifier 302 also changes. When the terminal 100 is at the location K, the time identifier in the displayed user interface 300 is "00:10/52:34", where "52:34" is used to indicate that total duration of the video (that is, the video of the eighteenth episode) currently played by the video application is 52 minutes and 34 seconds. Corresponding to "00:10", the playback duration identifier 303 is used to indicate that currently the video has been played to 10 seconds. The caching duration identifier 304 is used to indicate that currently data has been cached to 10 seconds. In this case, the playback duration identifier 303 coincides with the caching duration identifier 304, and video freeze occurs. In a subsequent process in which the user continues to travel from the location K to the location I, the terminal 100 is still in the abnormal area C, and has a problem of comparatively poor signal quality. Even if the download rate is higher than the third download rate, the download rate is still far below the first download rate. Therefore, freeze easily occurs during subsequent video playback, and user experience is comparatively poor.

Figure 9:
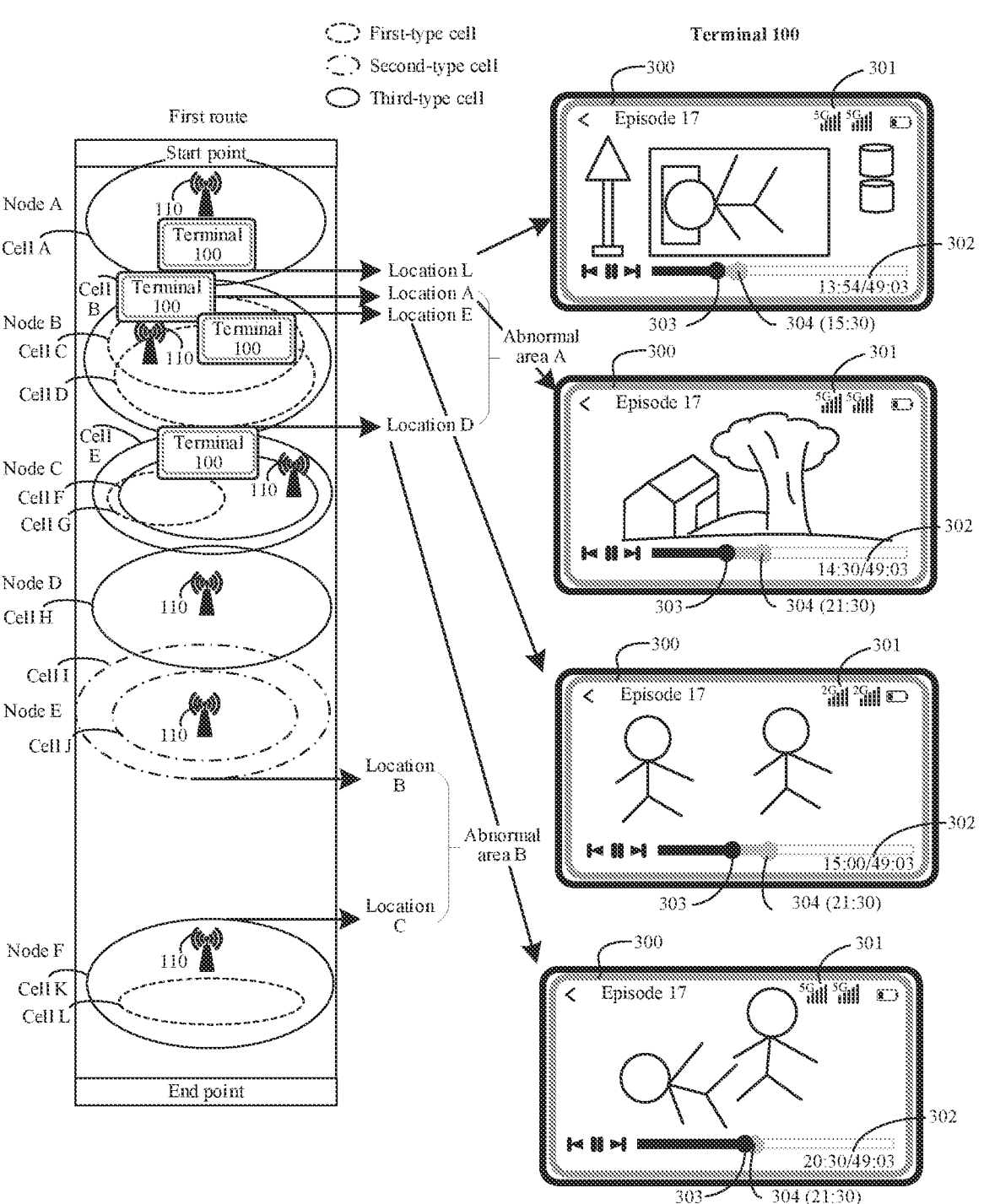
Figure 10:
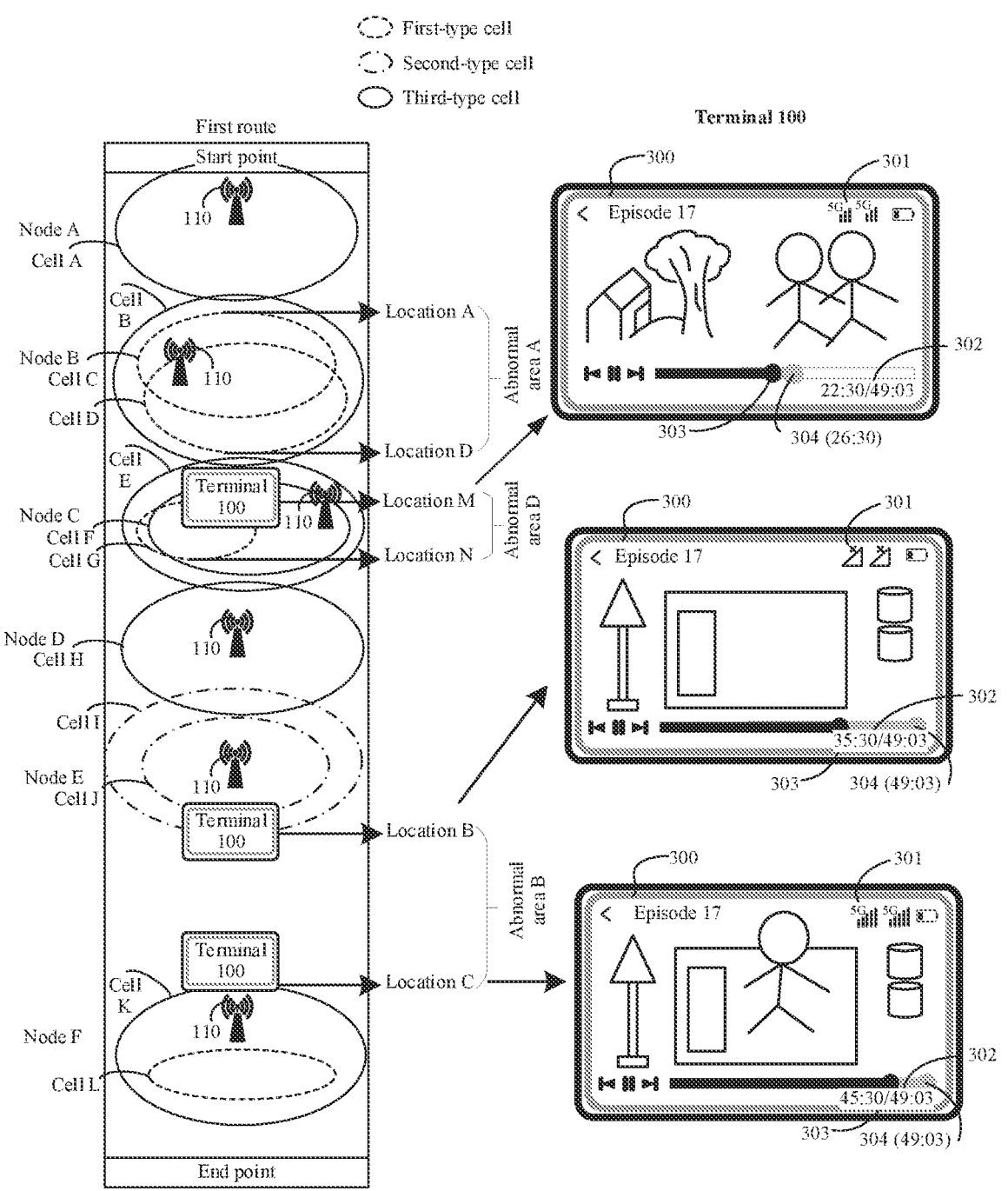
Figure 11:
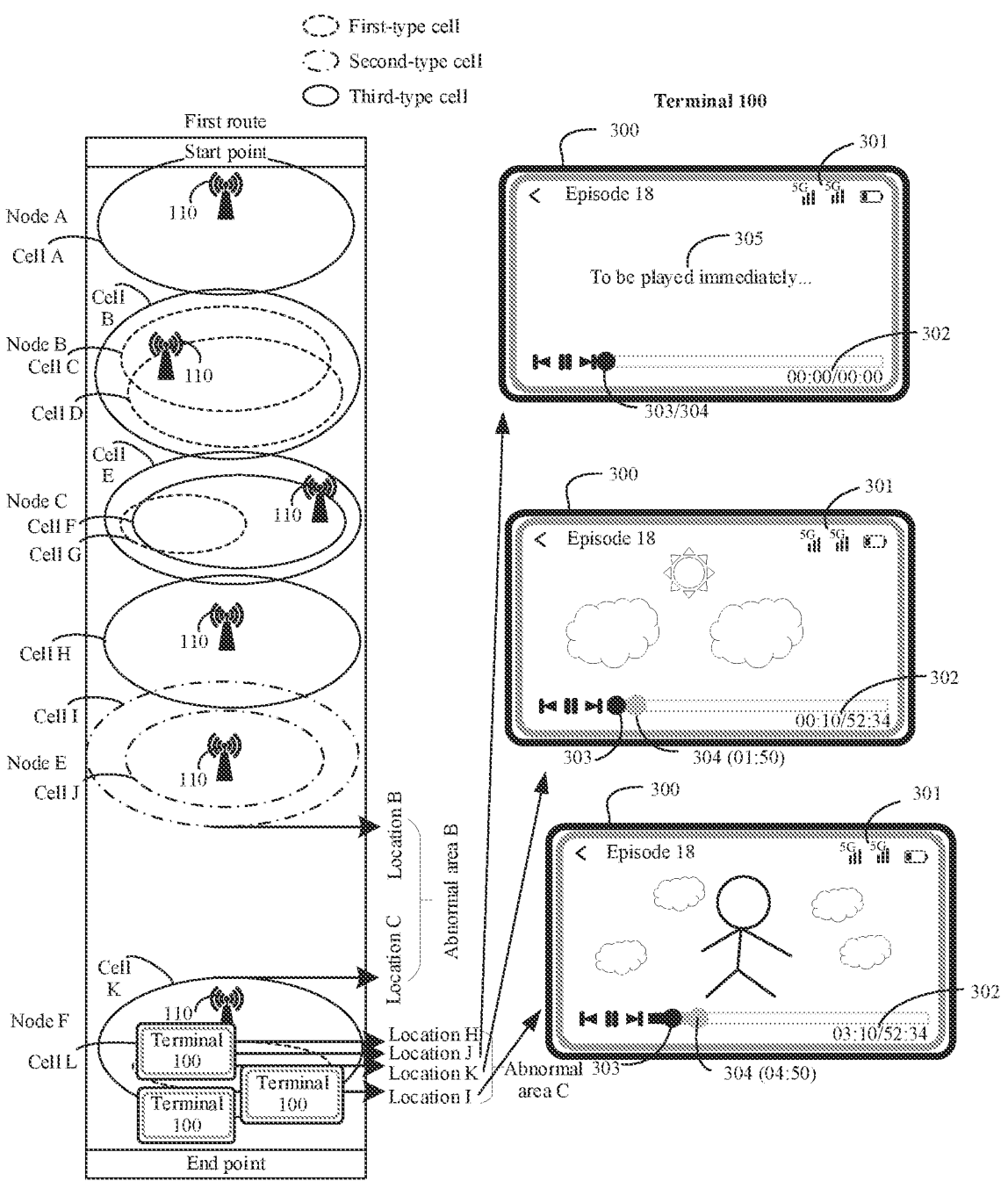

The following describes examples of some application scenarios of the data caching method provided in this application. Details are shown in FIG. 9 to FIG. 11 below. For related descriptions of a first route, a terminal 100, a base station 110, and the like in these application scenarios, refer to the descriptions in FIG. 3. Details are not described again.

In these application scenarios, before the terminal 100 sets off from a start point of the first route, the terminal 100 may receive preset path information of the first route and camping duration on the first route that are sent by a network device. The preset path information may include two cell and node handover lists, which are specifically a cell and node handover list 1 before a breakpoint (that is, a node E) without a next-hop node, and a cell and node handover list 2 after the node E. This may also be understood as a cell and node handover list 1 before an abnormal area B without coverage, and a cell and node handover list 2 after the abnormal area B without coverage For the cell and node handover list 1 and the cell and node handover list 2, refer to Table 8 and Table 9 above. Optionally, the terminal 100 may not know, at the beginning, that a route corresponding to the cell and node handover list 2 is to be subsequently passed through, but may determine a subsequent cell handover list and/or node handover list in a process of passing through the first route. For example, the terminal 100 may predict a movement direction based on a location of the terminal 100 when passing through the node E, so as to determine that a subsequent cell and node handover list is the cell and node handover list 2.

In FIG. 9 to FIG. 11 below, an example in which the preset path information that is of the first route and that is obtained by the terminal 100 includes the cell and node handover list 1 and the cell and node handover list 2 shown in Table 8 and Table 9 is used for description. In FIG. 9 to FIG. 11 below, an example in which the terminal 100 has a comparatively strong caching capability (for example, large storage space) and can keep caching data is used for description.

The camping duration obtained by the terminal 100 may be average duration $k_i$ of camping on each cell on the first route, where i is a positive integer, and a value range of i is [1, n]. Cell information on the first route is shown in Table 8 and Table 9 above, and therefore, n=12.

FIG. 9 is an example of a schematic diagram of a scenario in which data is cached by using a first caching policy.

As shown in FIG. 9, when a user is in a node A, the terminal 100 accesses a cell A, a network service is normal, and the user can normally watch a video by using a video application on the terminal 100. Before the user enters an abnormal area A, the terminal 100 may determine, based on the cell and node handover list 1, that two consecutive first-type cells, namely, a cell C and a cell D, are to be subsequently passed through. It is assumed that a sum of average duration of camping on the cell C and the cell D is comparatively long, for example, is $k_3+k_4=360$, expressed in seconds. Therefore, the terminal 100 may determine, based on the preset path information and the camping duration, that the terminal 100 is to subsequently pass through the abnormal area A whose passing-through duration is comparatively long, so as to determine to cache video data by using the first caching policy, that is, cache data before entering the abnormal area A. It is assumed that a caching end moment $t_1$ determined by the terminal 100 is a moment of entering the abnormal area A (that is, a moment at which the terminal 100 is handed over to the cell C, which is also a moment at which the terminal 100 is at a location A). The terminal 100 may determine, based on the passing-through duration (that is, 360 seconds) of the abnormal area A, to cache video data whose playback duration is 360 seconds. The terminal 100 is in the node A (that is, a normal area) before entering the abnormal area A, and a download rate in the normal area is a first download rate (that is, video data whose playback duration is 10 seconds is downloaded per second). In this case, the terminal 100 may determine that caching duration is $360\div10=36$ seconds. The terminal 100 may determine a caching start moment $t_0=t_1-36$ based on the caching end moment $t_1$ and the caching duration.

As shown in FIG. 9, assuming that the terminal 100 travels from a location L for 36 seconds to reach the location A, the terminal 100 starts to cache video data when the terminal 100 is at the location L in the node A, that is, this moment is the caching start moment to. In this case, a signal quality identifier 301 in a user interface 300 of the video application displayed by the terminal 100 is used to represent that the terminal 100 currently accesses a 5G network with five signal bars (that is, full bars), and a network service is normal. A time identifier 302 is "13:54/49:03", where "13:54" corresponds to a playback duration identifier 303, and both "13:54" and the playback duration identifier 303 are used to indicate that an image currently played by the video application is an image of the video at 13 minutes and 54 seconds. A caching duration identifier 304 is used to indicate that currently data has been cached to 15 minutes and 30 seconds. Although a difference between the caching duration and playback duration is greater than 30 seconds, the terminal 100 still starts to cache video data at this moment. In a process in which the terminal 100 travels from the location L to the location A, the terminal 100 keeps caching video data at the first download rate. The terminal 100 stops caching video data when arriving at the location A. A moment at which the terminal 100 arrives at the location A is the caching end moment $t_1$. In the process, the playback duration identifier 303 and the caching duration identifier 304 in the user interface 300 move, and the time identifier 302 also changes. The time identifier 302 is "14:30/49:03", where "14:30" corresponds to the playback duration identifier 303, and both "14:30" and the playback duration identifier 303 are used to indicate that an image currently played by the video application is an image of the video at 14 minutes and 30 seconds. The caching duration identifier 304 is used to indicate that currently data has been cached to 21 minutes and 30 seconds. In other words, in a process in which the terminal 100 travels from the location L to the location A, the terminal 100 downloads video data whose playback duration is 360 seconds (that is, 6 minutes).

As shown in FIG. 9, when the terminal 100 continues to travel from the location A for 30 seconds and arrives at a location E, in the user interface 300 displayed by the terminal 100, the signal quality identifier 301 is used to represent that the terminal 100 currently accesses a 2G network with five signal bars (that is, full bars). Compared with the previously accessed 5G network, in this case, the terminal 100 has fallen to a low network standard. The playback duration identifier 303 moves, and the time identifier 302 also changes. The time identifier 302 is "15:00/49:03", where "15:00" corresponds to the playback duration identifier 303, and both "15:00" and the playback duration identifier 303 are used to indicate that an image currently played by the video application is an image of the video at 15 minutes. Because the terminal 100 stops caching when entering the abnormal area A, and a caching condition of a third caching policy is not met, when the terminal 100 is in the abnormal area A, the terminal 100 does not download video data, and a location of the caching duration identifier 304 in the user interface 300 remains unchanged. The terminal 100 may continue to travel for 5 minutes and 30 seconds to reach a location D. When the terminal 100 is at the location D (that is, when the terminal 100 leaves the abnormal area A), the signal quality identifier 301 in the user interface 300 displayed by the terminal 100 is used to represent that the terminal 100 currently accesses a 5G network with five signal bars (that is, full bars), and a network service is normal. The time identifier 302 is "20:30/49:03", where "20:30" corresponds to the playback duration identifier 303, and both "20:30" and the playback duration identifier 303 are used to indicate that an image currently played by the video application is an image of the video at 20 minutes and 30 seconds. Same as the case in which the terminal 100 is at the location E, when the terminal 100 is in the abnormal area A, the terminal 100 does not download video data, and a location of the caching duration identifier 304 in the user interface 300 remains unchanged. It can be understood that, in a process in which the terminal 100 travels from the location E to the location D, caching duration is always greater than playback duration. Therefore, even if a network service is abnormal when the terminal 100 is in the abnormal area A, the user can still normally watch a video by using the video application, and video freeze caused when the terminal 100 is at the location F shown in FIG. 7 does not occur. User experience is comparatively good.

FIG. 10 is an example of another schematic diagram of a scenario in which data is cached by using the first caching policy.

As shown in FIG. 10, there is further an abnormal area D on the first route. The abnormal area D may be an area covered by a cell with comparatively poor network performance (that is, a first-type cell) in a node C. After the terminal 100 leaves the abnormal area A, the terminal 100 may determine, based on the cell and node handover list 1, that the terminal 100 is to subsequently pass through a first-type cell, namely, a cell G, and a second-type node, namely, a node E. The terminal 100 may determine, based on the second-type node to be subsequently passed through, that the terminal 100 is to subsequently pass through the abnormal area B without coverage. When the user passes through the abnormal area D, the terminal 100 accesses a first-type cell, and the terminal 100 may encounter cases such as falling to a low network standard, comparatively poor signal quality, and comparatively poor application experience quality. When the user passes through the abnormal area B without coverage, the terminal 100 cannot access a network, and network disconnection occurs. In this case, a download rate is 0. It is assumed that average duration of camping on the cell G is comparatively short, for example, less than 1 minute. Because the abnormal area B without coverage is to be subsequently passed through and passing-through duration of the abnormal area D is comparatively short, the terminal 100 may no longer determine a target caching policy for the abnormal area D, but directly determine the first caching policy for the abnormal area B without coverage, and cache video data based on the first caching policy. Because a video application service has a comparatively high QoS requirement, the terminal 100 may start to cache video data a plurality of nodes in advance. It is assumed that the terminal 100 starts to cache video data when it is determined that a closest first-type cell is accessed The terminal 100 may determine that the caching start moment to is a moment at which the terminal 100 accesses the cell G in the node C. It is assumed that the terminal 100 does not limit caching duration. The terminal 100 may determine that a moment at which network disconnection occurs is the caching end moment ty. When the terminal 100 is at a location M, the signal quality identifier 302 in the displayed user interface is used to represent that the terminal 100 currently accesses a 5G network with three signal bars (a full quantity of signal bars is 5), and signal quality is comparatively poor. The time identifier is "22:30/49:03", where "22:30" corresponds to the playback duration identifier 303, and both "22:30" and the playback duration identifier 303 are used to indicate that an image currently played by the video application is an image of the video at 22 minutes and 30 seconds. The caching duration identifier 304 is used to indicate that currently data has been cached to 26 minutes and 30 seconds.

As shown in FIG. 10, in a process in which the terminal 100 continues to travel from the location M for 13 minutes to reach the location B, the terminal 100 keeps downloading video data. In this process, a download rate of the terminal 100 may fluctuate. For example, when the terminal 100 is in the abnormal area D, the download rate is a third download rate: when the terminal 100 is in the node D, the download rate is a first download rate, and the terminal 100 keeps downloading video data. When the terminal 100 is at the location B, that is, when the terminal 100 enters the abnormal area B, the signal quality identifier 301 in the user interface 300 displayed by the terminal 100 is used to represent that the terminal 100 cannot access a network currently, network disconnection occurs, and the download rate is 0). In this case, the terminal 100 may stop caching video data. In this case, the time identifier 302 is "35:30/49:03", where "35:30" corresponds to the playback duration identifier 303, and both "35:30" and the playback duration identifier 303 are used to indicate that an image currently played by the video application is an image of the video at 35 minutes and 30 seconds. The caching duration identifier 304 is used to indicate that currently data has been cached to 49 minutes and 3 seconds, that is, video data of the entire seventeenth episode has been cached. In other words, in a process in which the terminal 100 travels from the location M to the location B, the terminal 100 downloads video data whose playback duration is 22 minutes and 33 seconds. The terminal 100 may continue to travel from the location B for 10 minutes to reach a location C. When the terminal 100 is at the location C (that is, when the terminal 100 leaves the abnormal area B), the signal quality identifier 301 in the user interface 300 displayed by the terminal 100 is used to represent that the terminal 100 currently accesses a 5G network with five signal bars (that is, full bars), and a network service is normal. The time identifier 302 is "45:30/49.03", where "45:30" corresponds to the playback duration identifier 303, and both "45:30" and the playback duration identifier 303 are used to indicate that an image currently played by the video application is an image of the video at 45 minutes and 30 seconds. When the terminal 100 is in the abnormal area B, the download rate is 0, and no video data is cached. Therefore, a location of the caching duration identifier 304 in the user interface 300) remains unchanged, and still indicates that currently data has been cached to 49 minutes and 3 seconds. It can be understood that, in a process in which the terminal 100 travels from the location B to the location C, caching duration is always greater than playback duration. Therefore, even if the terminal 100 is disconnected from a network in the abnormal area B, the user can still normally watch a video by using the video application, and video freeze caused when the terminal 100 is at the location G shown in FIG. 7 does not occur. User experience is comparatively good.

FIG. 11 is an example of a schematic diagram of a scenario in which data is cached by using a second caching policy.

An abnormal area C shown in FIG. 11 is similar to the abnormal area C shown in FIG. 8. It is assumed that, when the terminal 100 is at any location between a location H and a location J, a network service is normal; and when the terminal 100 is at any location between the location J and a location I, signal quality is comparatively poor.

As shown in FIG. 11, after the terminal 100 leaves the abnormal area B, the terminal 100 may access a cell K of a node F. Before the terminal 100 enters the abnormal area C, the terminal 100 may determine, based on the cell and node handover list 2, that the terminal 100 is to subsequently pass through a first-type cell, namely, a cell L. It is assumed that average duration of camping on the cell L is comparatively short, for example, less than 5 minutes, and it is assumed that the average duration of camping on the cell L is 3 minutes and 20 seconds. Therefore, the terminal 100 may determine to cache video data by using the second caching policy, that is, cache data after entering the abnormal area C. In other words, the terminal 100 may determine that a moment at which the terminal 100 accesses the cell L (that is, enters the abnormal area C, and is also at the location H) is the caching start moment to. It is assumed that the terminal 100 does not limit caching duration. The terminal 100 may determine that a moment at which the terminal 100 leaves the abnormal area C (that is, accesses the cell K for the second time, and is also at the location I) is the caching end moment $t_1$. The terminal 100 may access the cell K when arriving at the location H. To be specific, in a process in which the terminal 100 travels from the location H for 10 seconds to reach the location J, the terminal 100 accesses a 5G network with five signal bars (that is, full bars), and a network service is normal. In this process, the terminal 100 may keep downloading video data at the first download rate (that is, video data whose playback duration is 10 seconds is downloaded per second). Therefore, when arriving at the location J, the terminal 100 has downloaded video data of 100 seconds. It should be noted that, as shown in FIG. 10, the terminal 100 has downloaded all video data of the seventeenth episode before arriving at the location B. Therefore, the downloaded video data of 100 seconds herein is video data of a next episode (that is, the eighteenth episode).

As shown in FIG. 11, when the user arrives at the location J, the user taps the next episode In this case, the video application is obtaining video data of the next episode. Therefore, the displayed user interface is the same as the user interface 300 displayed by the terminal 100 when the user is at the location J shown in FIG. 8. However, a difference from FIG. 8 lies in that, although the playback duration identifier 303 coincides with the caching duration identifier 304, it does not mean that caching duration is 0, and it is just because the caching duration is not yet successfully obtained. Actually, in this case, the terminal 100 has downloaded video data of the first 100 seconds (that is, 1 minute and 40 seconds) of the eighteenth episode. The terminal 100 may continue to travel from the location J for 10 seconds to reach a location K. In this process, the terminal 100 accesses a 5G network with three signal bars (a full quantity of signal bars is 5), and signal quality is comparatively poor. In this process, the terminal 100 may keep downloading video data at the third download rate (that is, video data whose playback duration is 1 second is downloaded per second). Therefore, when the terminal 100 arrives at the location K, the caching duration identifier 304 in the user interface 300 displayed by the terminal 100 is used to indicate that currently data has been cached to 1 minute and 50 seconds. When the terminal 100 is at the location K, the time identifier in the displayed user interface 300 is "00:10/52:34", where "52:34" is used to indicate that total duration of a video (that is, a video of the eighteenth episode) currently played by the video application is 52 minutes and 34 seconds. Corresponding to "00:10", the playback duration identifier 303 is used to indicate that currently the video has been played to 10 seconds.

As shown in FIG. 11, the terminal 100 may continue to travel from the location K for 3 minutes to reach the location I. In this process, the terminal 100 may keep downloading video data at the third download rate. Therefore, when the terminal 100 arrives at the location I (that is, leaves the abnormal area C), the caching duration identifier 304 in the user interface 300 displayed by the terminal 100 is used to indicate that currently data has been cached to 4 minutes and 50 seconds. When the terminal 100 is at the location I, the time identifier in the displayed user interface 300 is "03:10/52:34". Corresponding to "03:10", the playback duration identifier 303 is used to indicate that currently the video has been played to 3 minutes and 10 seconds. It can be understood that, in a process in which the terminal 100 travels from the location J to the location I, caching duration is always greater than playback duration. Therefore, even if a network service of the terminal 100 is abnormal in the abnormal area C, the user can still normally watch a video by using the video application, and video freeze caused when the terminal 100 is at the location K shown in FIG. 8 does not occur. User experience is comparatively good.

This is not limited to the foregoing enumerated application scenarios. In specific implementation, the terminal may also use the first caching policy to cache video data for an abnormal area whose passing-through duration is comparatively short. A specific caching manner is not limited in this application.

A person of ordinary skill in the art may understand that all or some of the procedures in the methods in the foregoing embodiments may be implemented by a computer program instructing related hardware. The computer program may be stored in a computer-readable storage medium When the computer program is run, the procedures in the foregoing method embodiments may be performed. The foregoing storage medium includes any medium that can store computer program code, such as a read-only memory (read-only memory, ROM), a random access memory (random access memory. RAM), a magnetic disk, or an optical disc.

What is claimed is:

1. A data caching method, comprising:
running, by a terminal, a first application in a first area, wherein the first application is an online application, wherein the first area is in a first route, wherein the first route includes a second area, and wherein a first network performance of the first area is better than a second network performance of the second area;
displaying, by the terminal, a user interface of the first application;
obtaining, by the terminal, a moment of entering the second area and a duration of the terminal in the second area;
sending, to the first application based on the moment of entering the second area and the duration of the terminal in the second area, second indication information instructing the first application to cache data;
in response to the duration of the terminal in the second area is greater than or equal to a preset duration threshold, buffering, by the first application before the terminal enters the second area, first data as buffered first data; and
playing, by the first application, the buffered first data when the terminal enters the second area.

2. The method of claim 1, wherein the first application is a video application, and wherein the method further comprises buffering, by the first application, second data of a currently played video before the terminal enters the second area.

3. The method of claim 2, further comprising buffering, by the first application, fourth data before receiving the second indication information, wherein the fourth data corresponds to a first duration, the second data corresponds to a second duration, and the second duration is greater than the first duration.

4. The method of claim 1, wherein the first application is a video application, and wherein the method further comprises buffering, by the first application, third data of a next video of a currently played video before the terminal enters the second area.

5. The method of claim 1, further comprising:
caching, by the first application before receiving the second indication information, the data at a first download rate; and
caching, by the first application after receiving the second indication information, the data at a second download rate,
wherein the second download rate is greater than the first download rate.

6. The method of claim 1, further comprising obtaining, by the terminal, cell information of one or more cells that the terminal passes through.

7. The method of claim 1, further comprising:
sending, by a modem processor of the terminal, first indication information to an application processor; and
sending, by the application processor of the terminal, the second indication information to the first application after the application processor receives the first indication information.

8. The method of claim 7, wherein the first indication information further comprises the duration of the terminal in the second area.

9. The method of claim 1, further comprising:

buffering, by the terminal when a current service of the terminal is a first service type, the first data at a first time before entering the second area; and buffering, by the terminal when the current service of the terminal is a second service type, the first data at a second time before entering the second area, wherein the first time is earlier than the second time, and wherein a quality of service requirement of the first service type is higher than that of the second service type.

10. The method of claim 1, wherein the first route is a fixed route of a train, a high-speed rail, a subway, or a bus.

11. A terminal, comprising:

a memory configured to store a computer program; and a processor coupled to the memory and configured to execute the computer program to cause the terminal to:

run a first application in a first area, wherein the first application is an online application, wherein the first area is in a first route, wherein the first route includes a second area, and wherein a first network performance of the first area is better than a second network performance of the second area;

display a user interface of the first application;

determine a moment of entering the second area and a duration of the terminal in the second area;

send, to the first application based on the moment of entering the second area and the duration of the terminal in the second area, second indication information instructing the first application to cache data;

in response to the duration of the terminal in the second area being greater than or equal to a preset duration threshold, buffer, by the first application before the terminal enters the second area, first data as buffered first data; and play, by the first application, the buffered first data when the terminal enters the second area.

12. A non-transitory computer storage medium storing computer-executable instructions which, when executed by a processor, cause a terminal to:

run, by the terminal, a first application in a first area, wherein the first application is an online application, wherein the first area is in a first route, wherein the first route includes a second area, and wherein a first network performance of the first area is better than a second network performance of the second area;

display, by the terminal, a user interface of the first application;

determine, by the terminal, a moment of entering the second area and a duration of the terminal in the second area;

send, by the terminal based on the moment of entering the second area and the duration of the terminal in the second area, second indication information to the first application, wherein the second indication information is used to instruct the first application to cache data;

in response to the duration of the terminal in the second area being greater than or equal to a preset duration threshold, buffer, by the first application before the terminal enters the second area, first data as buffered first data; and play, by the first application, the buffered first data when the terminal enters the second area.

13. The non-transitory computer storage medium of claim 12, wherein the first application is a video application, and wherein the computer-executable instructions further cause the terminal to:

buffer, by the first application, second data of a currently played video before the terminal enters the second area; and buffer, by the first application, fourth data before receiving the second indication information, wherein the fourth data corresponds to a first duration, the second data corresponds to a second duration, and the second duration is greater than the first duration.

14. The non-transitory computer storage medium of claim 12, wherein the computer-executable instructions further cause the terminal to:

cache, by the first application before receiving the second indication information, at a first download rate; and cache, by the first application after receiving the second indication information, at a second download rate, wherein the second download rate is greater than the first download rate.

15. The non-transitory computer storage medium of claim 12, wherein the computer-executable instructions further cause the terminal to:

buffer, by the terminal when a current service of the terminal is a first service type, the first data at a first time before entering the second area; and buffer, by the terminal when the current service of the terminal is a second service type, the first data at a second time before entering the second area, wherein the first time is earlier than the second time, and wherein a quality of service requirement of the first service type is higher than that of the second service type.

16. The terminal of claim 11, wherein the first application is a video application, and wherein the processor is further configured to execute the computer program to cause the terminal to:

buffer, by the first application, second data of a currently played video before the terminal enters the second area; and buffer, by the first application, fourth data before receiving the second indication information, wherein the fourth data corresponds to a first duration, the second data corresponds to a second duration, and the second duration is greater than the first duration.

17. The terminal of claim 11, wherein the processor is further configured to execute the computer program to cause the terminal to:

cache, by the first application before receiving the second indication information, at a first download rate; and cache, by the first application after receiving the second indication information, at a second download rate, wherein the second download rate is greater than the first download rate.

18. The terminal of claim 11, wherein the processor is further configured to execute the computer program to cause the terminal to:

buffer, by the terminal when a current service of the terminal is a first service type, the first data at a first time before entering the second area; and buffer, by the terminal when the current service of the terminal is a second service type, the first data at a second time before entering the second area, wherein the first time is earlier than the second time, and wherein a quality of service requirement of the first service type is higher than that of the second service type.

19. The method of claim 1, further comprising:

determining a terminal speed of the terminal; and determining a distance identifier of the terminal based on a quantity of nodes between a current node of the terminal to a target node of the terminal, wherein buffering the first data as buffered first data further comprises buffering, before the terminal enters the second area and according to a caching policy, first data as buffered first data, wherein the caching policy is based on the terminal speed and the distance identifier.

20. The method of claim 19, wherein the caching policy comprises buffering the first data as the buffered first data when the terminal speed is greater than a speed threshold and the distance identifier is less than or equal a preset distance value.

* * * * *